US011972714B2

(12) United States Patent
Cho

(10) Patent No.: US 11,972,714 B2
(45) Date of Patent: Apr. 30, 2024

(54) DISPLAY DEVICE AND METHOD OF PRECHARGING BASED ON GAMMA VALUES

(71) Applicant: LG DISPLAY CO., LTD., Seoul (KR)

(72) Inventor: Chang Hun Cho, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/748,309

(22) Filed: May 19, 2022

(65) Prior Publication Data

US 2022/0392384 A1 Dec. 8, 2022

(30) Foreign Application Priority Data

Jun. 4, 2021 (KR) ........................ 10-2021-0072765

(51) Int. Cl.
*G09G 3/32* (2016.01)
*G09G 3/20* (2006.01)
(Continued)

(52) U.S. Cl.
CPC ................. *G09G 3/20* (2013.01); *G09G 3/32* (2013.01); *G09G 3/3225* (2013.01); *G09G 3/3275* (2013.01); *G09G 3/3291* (2013.01); *G09G 3/3685* (2013.01); *G09G 2300/0408* (2013.01); *G09G 2310/0248* (2013.01); *G09G 2310/027* (2013.01); *G09G 2310/0286* (2013.01); *G09G 2310/0289* (2013.01); *G09G 2310/0291* (2013.01); *G09G 2310/0297* (2013.01); *G09G 2310/061* (2013.01); *G09G 2310/08* (2013.01);
(Continued)

(58) Field of Classification Search
CPC ...... G09G 3/20; G09G 3/3225; G09G 3/3275; G09G 3/3685; G09G 2300/0408; G09G 2310/0248; G09G 2310/027; G09G 2310/0286; G09G 2310/0289; G09G 2310/0291; G09G 2310/0297; G09G 2310/061; G09G 2310/08; G09G 2330/02; G09G 2330/023; G09G 2340/16; G09G 2360/16; G09G 3/32; G09G 3/3291
See application file for complete search history.

(56) References Cited

U.S. PATENT DOCUMENTS

2003/0030616 A1* 2/2003 Maeda ................ G09G 3/3688 345/98
2004/0257313 A1* 12/2004 Kawashima ......... G09G 3/3283 345/76

(Continued)

FOREIGN PATENT DOCUMENTS

KR 10-1920763 B1 2/2019
KR 10-2019-0027538 A 3/2019

(Continued)

*Primary Examiner* — Adam J Snyder
(74) *Attorney, Agent, or Firm* — POLSINELLI PC

(57) ABSTRACT

A display device including a display panel configured to display an image, a data driver configured to supply a data voltage to the display panel and having a precharge circuit configured to perform a precharging operation, and a timing controller configured to control the data driver, wherein the charge circuit generates a precharge voltage based on a precharge signal supplied in a horizontal blank period and is controlled to output or not output the precharge voltage based on a precharge selection signal.

11 Claims, 25 Drawing Sheets

(51) Int. Cl.
*G09G 3/3225* (2016.01)
*G09G 3/3275* (2016.01)
*G09G 3/3291* (2016.01)
*G09G 3/36* (2006.01)

(52) U.S. Cl.
CPC ... *G09G 2330/02* (2013.01); *G09G 2330/023* (2013.01); *G09G 2340/16* (2013.01); *G09G 2360/16* (2013.01)

(56) References Cited

U.S. PATENT DOCUMENTS

| | | | | |
|---|---|---|---|---|
| 2005/0156820 | A1* | 7/2005 | Aoki | G09G 3/3648<br>345/58 |
| 2006/0291309 | A1* | 12/2006 | Maki | G09G 3/3688<br>365/189.05 |
| 2008/0278427 | A1* | 11/2008 | Jang | G09G 3/3688<br>345/98 |
| 2008/0303771 | A1* | 12/2008 | Chen | G09G 3/3688<br>345/94 |
| 2008/0303804 | A1* | 12/2008 | Schmidt | G09G 3/3291<br>345/83 |
| 2013/0083093 | A1* | 4/2013 | Kim | G09G 3/3258<br>345/212 |
| 2013/0127806 | A1* | 5/2013 | Wu | G09G 3/3685<br>345/211 |
| 2013/0257917 | A1* | 10/2013 | Peng | G09G 3/3688<br>345/690 |
| 2014/0160104 | A1* | 6/2014 | Lin | G09G 3/3614<br>345/212 |
| 2014/0320464 | A1* | 10/2014 | Ryu | G09G 3/3688<br>345/204 |
| 2015/0103065 | A1* | 4/2015 | Kim | G09G 3/3614<br>345/212 |
| 2017/0018242 | A1* | 1/2017 | Lin | G09G 3/3688 |

FOREIGN PATENT DOCUMENTS

| | | | |
|---|---|---|---|
| KR | 10-2019-0056551 | A | 5/2019 |
| KR | 102090607 | B1 | 3/2020 |

* cited by examiner

FIG. 13

| Pattern | Data | R | G | B | R | G | B | R | G | B | R | G | B |
|---|---|---|---|---|---|---|---|---|---|---|---|---|---|
| Subdot | Line(n-1) | 0 | 255 | 0 | 255 | 0 | 255 | 0 | 255 | 0 | 255 | 0 | 255 |
| | Line(n) | 255 | 0 | 255 | 0 | 255 | 0 | 255 | 0 | 255 | 0 | 255 | 0 |
| | | | | | | | | | | | | | |
| | Line(n-1)-Line(n) | -255 | 255 | -255 | 255 | -255 | 255 | -255 | 255 | -255 | 255 | -255 | 255 |
| | abs(Line(n-1)-Line(n)) | 255 | 255 | 255 | 255 | 255 | 255 | 255 | 255 | 255 | 255 | 255 | 255 |
| | | | | | | | | | | | | | |
| | P/C-data(n)-Line(n) | -129 | 127 | -129 | 127 | -129 | 127 | -129 | 127 | -129 | 127 | -129 | 127 |
| | abs(P/C-data(n)-Line(n)) | 129 | 127 | 129 | 127 | 129 | 127 | 129 | 127 | 129 | 127 | 129 | 127 |

*diff_Origin-diff_pre>0*

| | |
|---|---|
| avg_Line(n-1) | 128 |
| avg_Line(n) | 128 |
| P/C-data(n) | 127 |

| | |
|---|---|
| diff_origin | 255 |
| diff_pre | 128 |

| | |
|---|---|
| P/C_SEL | 1 |

FIG. 14

| Pattern | Data | R | G | B | R | G | B | R | G | B | R | G | B |
|---|---|---|---|---|---|---|---|---|---|---|---|---|---|
| H-1Line | Line(n-1) | 255 | 255 | 255 | 255 | 255 | 255 | 255 | 255 | 255 | 255 | 255 | 255 |
| | Line(n) | 0 | 0 | 0 | 0 | 0 | 0 | 0 | 0 | 0 | 0 | 0 | 0 |
| | | | | | | | | | | | | | |
| | Line(n-1)-Line(n) | 255 | 255 | 255 | 255 | 255 | 255 | 255 | 255 | 255 | 255 | 255 | 255 |
| | abs(Line(n-1)-Line(n)) | 255 | 255 | 255 | 255 | 255 | 255 | 255 | 255 | 255 | 255 | 255 | 255 |
| | | | | | | | | | | | | | |
| | P/C-data(n)-Line(n) | 127 | 127 | 127 | 127 | 127 | 127 | 127 | 127 | 127 | 127 | 127 | 127 |
| | abs(P/C-data(n)-Line(n)) | 127 | 127 | 127 | 127 | 127 | 127 | 127 | 127 | 127 | 127 | 127 | 127 |

diff_Origin-diff_pre>0

| | |
|---|---|
| avg_Line(n-1) | 255 |
| avg_Line(n) | 0 |
| P/C-data(n) | 127 |

| | |
|---|---|
| diff_origin | 255 |
| diff_pre | 127 |

| | |
|---|---|
| P/C_SEL | 1 |

FIG. 15

| Pattern | Data | R | G | B | R | G | B | R | G | B | R | G | B |
|---|---|---|---|---|---|---|---|---|---|---|---|---|---|
| Sub2dot | Line(n-1) | 0 | 0 | 255 | 255 | 0 | 0 | 255 | 255 | 0 | 0 | 255 | 255 |
| | Line(n) | 255 | 255 | 0 | 0 | 255 | 255 | 0 | 0 | 255 | 255 | 0 | 0 |
| | Line(n-1)-Line(n) | -255 | -255 | 255 | 255 | -255 | -255 | 255 | 255 | -255 | -255 | 255 | 255 |
| | abs(Line(n-1)-Line(n)) | 255 | 255 | 255 | 255 | 255 | 255 | 255 | 255 | 255 | 255 | 255 | 255 |
| | P/C-data(n)-Line(n) | -128 | -128 | 127 | 127 | -128 | -128 | 127 | 127 | -128 | -128 | 127 | 127 |
| | abs(P/C-data(n)-Line(n)) | 128 | 128 | 127 | 127 | 128 | 128 | 127 | 127 | 128 | 128 | 127 | 127 |

diff_Origin-diff_pre>0

| | |
|---|---|
| avg_Line(n-1) | 128 |
| avg_Line(n) | 128 |
| P/C-data(n) | 127 |
| diff_orgin | 255 |
| diff_pre | 128 |
| P/C_SEL | 1 |

FIG. 16

| Pattern | Data | R | G | B | R | G | B | R | G | B | R | G | B |
|---|---|---|---|---|---|---|---|---|---|---|---|---|---|
| Dot | Line(n-1) | 255 | 255 | 255 | 0 | 0 | 0 | 255 | 255 | 255 | 0 | 0 | 0 |
| | Line(n) | 0 | 0 | 0 | 255 | 255 | 255 | 0 | 0 | 0 | 255 | 255 | 255 |
| | | | | | | | | | | | | | |
| | Line(n-1)-Line(n) | 255 | 255 | 255 | -255 | -255 | -255 | 255 | 255 | 255 | -255 | -255 | -255 |
| | abs(Line(n-1)-Line(n)) | 255 | 255 | 255 | 255 | 255 | 255 | 255 | 255 | 255 | 255 | 255 | 255 |
| | | | | | | | | | | | | | |
| | P.C-data(n)-Line(n) | 127 | 127 | 127 | -129 | -129 | -129 | 127 | 127 | 127 | -129 | -129 | -129 |
| | abs(P.C-data(n)-Line(n)) | 127 | 127 | 127 | 129 | 129 | 129 | 127 | 127 | 127 | 129 | 129 | 129 |

diff_Origin-diff_pre>0

| | |
|---|---|
| avg_Line(n-1) | 128 |
| avg_Line(n) | 128 |
| P.C-data(n) | 127 |

| | |
|---|---|
| diff_origin | 255 |
| diff_pre | 128 |

| | |
|---|---|
| P.C_SEL | 1 |

FIG. 17

| Pattern | Data | R | G | B | R | G | B | R | G | B | R | G | B |
|---|---|---|---|---|---|---|---|---|---|---|---|---|---|
| Random | Line(n-1) | 123 | 1 | 177 | 175 | 203 | 32 | 89 | 162 | 177 | 176 | 128 | 33 |
| | Line(n) | 159 | 103 | 115 | 158 | 117 | 140 | 240 | 2 | 43 | 129 | 221 | 127 |
| | | | | | | | | | | | | | |
| | Line(n-1)-Line(n) | -36 | -102 | 62 | 17 | 86 | -108 | -151 | 160 | 134 | 47 | -95 | -94 |
| | abs(Line(n-1)-Line(n)) | 36 | 102 | 62 | 17 | 86 | 108 | 151 | 160 | 134 | 47 | 95 | 94 |
| | | | | | | | | | | | | | |
| | P/C-data(n)-Line(n) | -34 | 22 | 10 | -33 | 8 | -15 | -115 | 123 | 82 | -4 | -96 | -2 |
| | abs(P/C-data(n)-Line(n)) | 34 | 22 | 10 | 33 | 8 | 15 | 115 | 123 | 82 | 4 | 96 | 2 |

diff_Origin-diff_pre>0

| | |
|---|---|
| avg_Line(n-1) | 123 |
| avg_Line(n) | 130 |
| P/C-data(n) | 125 |

| | |
|---|---|
| diff_origin | 91 |
| diff_pre | 45 |

| | |
|---|---|
| P/C_SEL | 1 |

FIG. 18

| Pattern | Data | R | G | B | R | G | B | R | G | B | R | G | B |
|---|---|---|---|---|---|---|---|---|---|---|---|---|---|
| Red | Line(n-1) | 255 | 0 | 0 | 255 | 0 | 0 | 255 | 0 | 0 | 255 | 0 | 0 |
| | Line(n) | 255 | 0 | 0 | 255 | 0 | 0 | 255 | 0 | 0 | 255 | 0 | 0 |
| | | | | | | | | | | | | | |
| | Line(n-1)-Line(n) | 0 | 0 | 0 | 0 | 0 | 0 | 0 | 0 | 0 | 0 | 0 | 0 |
| | abs(Line(n-1)-Line(n)) | 0 | 0 | 0 | 0 | 0 | 0 | 0 | 0 | 0 | 0 | 0 | 0 |
| | | | | | | | | | | | | | |
| | P/C-data(n)-Line(n) | -171 | 84 | 84 | -171 | 84 | 84 | -171 | 84 | 84 | -171 | 84 | 84 |
| | abs(P/C-data(n)-Line(n)) | 171 | 84 | 84 | 171 | 84 | 84 | 171 | 84 | 84 | 171 | 84 | 84 |

*diff_Origin-diff_pre<0*

| | |
|---|---|
| avg_Line(n-1) | 85 |
| avg_Line(n) | 85 |
| P/C-data(n) | 84 |

| | |
|---|---|
| diff_origin | 0 |
| diff_pre | 113 |

| | |
|---|---|
| P/C_SEL | |

FIG. 19

| Pattern | Data | R | G | B | R | G | B | R | G | B | R | G | B |
|---|---|---|---|---|---|---|---|---|---|---|---|---|---|
| Green | Line(n-1) | 0 | 127 | 0 | 0 | 127 | 0 | 0 | 127 | 0 | 0 | 127 | 0 |
| | Line(n) | 0 | 127 | 0 | 0 | 127 | 0 | 0 | 127 | 0 | 0 | 127 | 0 |
| | | | | | | | | | | | | | |
| | Line(n-1)-Line(n) | 0 | 0 | 0 | 0 | 0 | 0 | 0 | 0 | 0 | 0 | 0 | 0 |
| | abs(Line(n-1)-Line(n)) | 0 | 0 | 0 | 0 | 0 | 0 | 0 | 0 | 0 | 0 | 0 | 0 |
| | | | | | | | | | | | | | |
| | P/C-data(n)-Line(n) | 41 | -86 | 41 | 41 | -86 | 41 | 41 | -86 | 41 | 41 | -86 | 41 |
| | abs(P/C-data(n)-Line(n)) | 41 | 86 | 41 | 41 | 86 | 41 | 41 | 86 | 41 | 41 | 86 | 41 |

*diff_Origin-diff_pre<0*

| | |
|---|---|
| avg_Line(n-1) | 42 |
| avg_Line(n) | 42 |
| P/C-data(n) | 41 |

| | |
|---|---|
| diff_origin | 0 |
| diff_pre | 56 |

| | |
|---|---|
| P/C_SEL | [illegible] |

FIG. 20

| Pattern | Data | R | G | B | R | G | B | R | G | B | R | G | B |
|---|---|---|---|---|---|---|---|---|---|---|---|---|---|
| Gray | Line(n-1) | 255 | 255 | 255 | 255 | 255 | 255 | 255 | 255 | 255 | 255 | 255 | 255 |
| | Line(n) | 255 | 255 | 255 | 255 | 255 | 255 | 255 | 255 | 255 | 255 | 255 | 255 |
| | | | | | | | | | | | | | |
| | Line(n-1)-Line(n) | 0 | 0 | 0 | 0 | 0 | 0 | 0 | 0 | 0 | 0 | 0 | 0 |
| | abs(Line(n-1)-Line(n)) | 0 | 0 | 0 | 0 | 0 | 0 | 0 | 0 | 0 | 0 | 0 | 0 |
| | | | | | | | | | | | | | |
| | P/C-data(n)-Line(n) | -1 | -1 | -1 | -1 | -1 | -1 | -1 | -1 | -1 | -1 | -1 | -1 |
| | abs(P/C-data(n)-Line(n)) | 1 | 1 | 1 | 1 | 1 | 1 | 1 | 1 | 1 | 1 | 1 | 1 |

*diff_Origin-diff_pre<0*

| | |
|---|---|
| avg_Line(n-1) | 255 |
| avg_Line(n) | 255 |
| P/C-data(n) | 254 |

| | |
|---|---|
| diff_orgin | 0 |
| diff_pre | 1 |

| | |
|---|---|
| P/C_SEL | [illegible] |

FIG. 21

| Pattern | Data | R | G | B | R | G | B | R | G | B | R | G | B |
|---|---|---|---|---|---|---|---|---|---|---|---|---|---|
| Vsub | Line(n-1) | 0 | 255 | 0 | 255 | 0 | 255 | 0 | 255 | 0 | 255 | 0 | 255 |
| | Line(n) | 0 | 255 | 0 | 255 | 0 | 255 | 0 | 255 | 0 | 255 | 0 | 255 |
| | | | | | | | | | | | | | |
| | Line(n-1)-Line(n) | 0 | 0 | 0 | 0 | 0 | 0 | 0 | 0 | 0 | 0 | 0 | 0 |
| | abs(Line(n-1)-Line(n)) | 0 | 0 | 0 | 0 | 0 | 0 | 0 | 0 | 0 | 0 | 0 | 0 |
| | | | | | | | | | | | | | |
| | P/C-data(n)-Line(n) | 127 | -129 | 127 | -129 | 127 | -129 | 127 | -129 | 127 | -129 | 127 | -129 |
| | absP/C-data(n)-Line(n)) | 127 | 129 | 127 | 129 | 127 | 129 | 127 | 129 | 127 | 129 | 127 | 129 |

diff_Origin-diff_pre<0

| | |
|---|---|
| avg_Line(n-1) | 128 |
| avg_Line(n) | 128 |
| P/C-data(n) | 127 |
| diff_orgin | 0 |
| diff_pre | 128 |
| P/C_SEL | 0 |

DISPLAY DEVICE AND METHOD OF PRECHARGING BASED ON GAMMA VALUES

CROSS-REFERENCE TO RELATED APPLICATION

This application claims the priority of Korean Patent Application No. 10-2021-0072765, filed on Jun. 4, 2021, which is hereby incorporated by reference in its entirety.

BACKGROUND

Field of the Disclosure

The present disclosure relates to a display device and a driving method thereof.

Description of the Background

With the development of information technology, the market for display devices, which are connection media between users and information, is growing. Accordingly, display devices such as a light emitting display device (LED), a quantum dot display device (QDD), and a liquid crystal display device (LCD) are increasingly used.

The display devices described above include a display panel including sub-pixels, a driver that outputs a driving signal for driving the display panel, and a power supply that generates power to be supplied to the display panel or the driver, and the like.

The above-described display devices can display images in such a manner that selected sub-pixels transmit light or directly emit light when driving signals, for example, scan signals and data signals, are supplied to sub-pixels formed in a display panel.

SUMMARY

Accordingly, the present disclosure is to maximize the effect of reducing current consumption without degrading the performance of a specific device by performing an adaptive precharging operation regardless of an image pattern.

To achieve these and other advantages and in accordance with the purpose of the disclosure, as embodied and broadly described herein, a display device includes a display panel configured to display an image, a data driver configured to supply a data voltage to the display panel and having a precharge circuit configured to perform a precharging operation, and a timing controller configured to control the data driver, wherein the charge circuit generates a precharge voltage based on a precharge signal supplied in a horizontal blank period and is controlled to output or not output the precharge voltage based on a precharge selection signal.

The precharge circuit may include a precharge voltage generator configured to generate the precharge voltage based on the precharge signal, and a precharge voltage transfer circuit configured to transfer the precharge voltage to output channels of the data driver based on the precharge selection signal.

The precharge voltage transfer circuit may include precharge switches connected to charge-sharing switches performing a charge-sharing operation such that charges are shared between at least two of the output channels of the data driver.

The precharging operation and the charge-sharing operation may partially overlap.

The precharging operation and the charge-sharing operation may be simultaneously terminated.

The precharge voltage generator may include a latch, a DA converter, and an amplifier configured to generate the precharge voltage based on the precharge signal.

The DA converter may be the same as a DA converter included in the data driver, or may have the number of bits less than that of the DA converter included in the data driver by at least 1 bit.

The precharge voltage generator may include a selector for selecting one of gamma voltages output from a gamma voltage generator and outputting the selected gamma voltage as the precharge voltage based on the precharge signal.

The timing controller may include a precharge signal generator for generating the precharge signal, and a precharge selection signal generator for generating the precharge selection signal, wherein the precharge selection signal generator generates the precharge selection signal based on an average value of absolute values obtained by subtracting current line data signals from previous line data signals and an average value of absolute values obtained by subtracting the current line data signals from previous precharge data signals.

In another aspect of the present disclosure, a method for driving a display device including a display panel configured to display an image, a data driver configured to supply a data voltage to the display panel and having a precharge circuit configured to perform a precharging operation, and a timing controller configured to control the data driver includes generating a current precharge signal for generating a current precharge voltage based on an average value of current line data signals and an average value of previous line data signals, generating a precharge selection signal for determining whether to output the precharge voltage based on an average value of absolute values obtained by subtracting the current line data signals from the previous line data signals and an average value of absolute values obtained by subtracting the current line data signals from previous precharge signals, and outputting the precharge voltage through output channels of the data driver based on the current precharge signal and the precharge selection signal.

The outputting of the precharge voltage may partially overlap with charge-sharing for causing charges to be shared between at least two of the output channels of the data driver.

The outputting of the precharge voltage and the charge-sharing may be simultaneously terminated.

The present disclosure can maximize the effect of reducing current consumption without degrading the performance of a specific device (e.g., deterioration of driving performance when a data voltage is output, deterioration of the performance of a touch sensor due to a high impedance period, etc.) by performing an adaptive precharging operation irrespective of an image pattern.

BRIEF DESCRIPTION OF THE DRAWINGS

FIGS. 13 to 17 are diagrams showing examples of a pattern in which a precharging operation is performed;

FIGS. 18 to 21 are diagrams showing examples of a pattern in which the precharging operation is not performed;

DETAILED DESCRIPTION

A display device according to the present disclosure may be implemented as a television, a video player, a personal computer (PC), a home theater, an automobile electric device, a smartphone, and the like, but is not limited thereto. The display device according to the present disclosure may be implemented as a light emitting display device (LED), a quantum dot display device (QDD), a liquid crystal display device (LCD), or the like.

Figure 1:
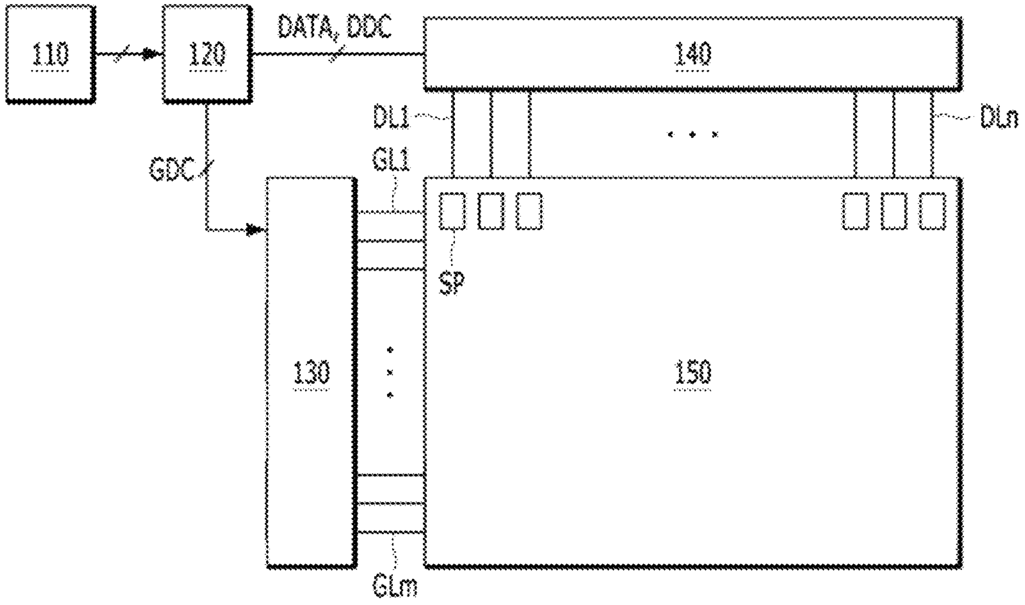
FIG. 1 is a block diagram schematically showing a configuration of a display device.
Figure 2:
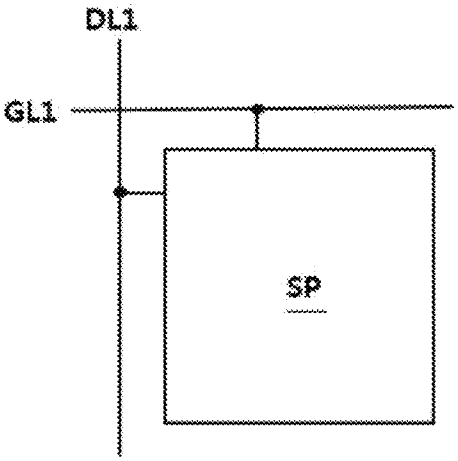
FIG. 2 is a configuration diagram schematically showing a sub-pixel in FIG. 1.

FIG. 1 is a block diagram schematically showing a configuration of a display device, and FIG. 2 is a configuration diagram schematically showing a sub-pixel in FIG. 1.

As shown in FIGS. 1 and 2, the display device may include an image supply unit 110, a timing controller 120, a gate driver 130, a data driver 140, a display panel 150, and the like.

The image supply unit 110 (set or host system) may output various driving signals along with an image data signal supplied from the outside or an image data signal stored in an internal memory. The image supply unit 110 may supply a data signal and various driving signals to the timing controller 120.

The timing controller 120 may output a gate timing control signal GDC for controlling the operation timing of the gate driver 130, a data timing control signal DDC for controlling the operation timing of the data driver 140, and various synchronization signals. The timing controller 120 may supply a data signal Data supplied from the image supply unit 110 along with the data timing control signal DDC to the data driver 140. The timing controller 120 may take the form of an integrated circuit (IC) and mounted on a printed circuit board, but is not limited thereto.

The gate driver 130 may output a gate signal (or a scan signal) in response to the gate timing control signal GDC supplied from the timing controller 120. The gate driver 130 may supply gate signals to sub-pixels included in the display panel 150 through gate lines GL1 to GLm. The gate driver 130 may take the form of an IC or may be formed directly on the display panel 150 through a gate-in-panel method, but is not limited thereto.

The data driver 140 may sample and latch the data signal Data in response to the data timing control signal DDC supplied from the timing controller 120, convert the digital data signal into an analog data voltage based on a gamma reference voltage, and output the analog data voltage. The data driver 140 may supply the data voltage to the sub-pixels included in the display panel 150 through data lines DL1 to DLn. The data driver 140 may take the form of an IC and mounted on the display panel 150 or mounted on a printed circuit board, but is not limited thereto.

The display panel 150 may display an image in response to a gate signal and a data voltage. The display panel 150 may be manufactured based on a substrate having rigidity or flexibility, such as glass, silicon, polyimide, or the like. The display panel 150 may display an image based on pixels including red, green, and blue sub-pixels or pixels including red, green, blue, and white sub-pixels. One sub-pixel SP may receive a data voltage and a gate signal through the first data line DL1 and the first gate line GL1. Although the sub-pixel SP may be configured in various shapes, it is simply illustrated in the form of a block here. In addition, the display panel 150 may include a touch sensor (or touchscreen) capable of sensing touch of a user.

The timing control unit 120, the gate driver 130, and the data driver 140 have been described above as individual components. However, one or more of the timing controller 120, the gate driver 130, and the data driver 140 may be integrated into one IC depending on the implementation method of the display device.

Figure 3A:
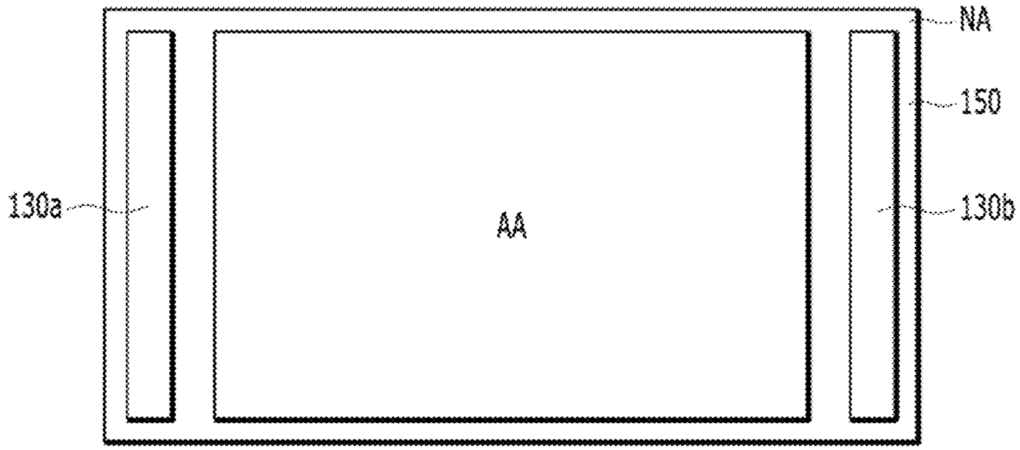
FIGS. 3A and 3B are diagrams showing examples of arrangement of gate-in-panel type gate drivers.
Figure 3B:
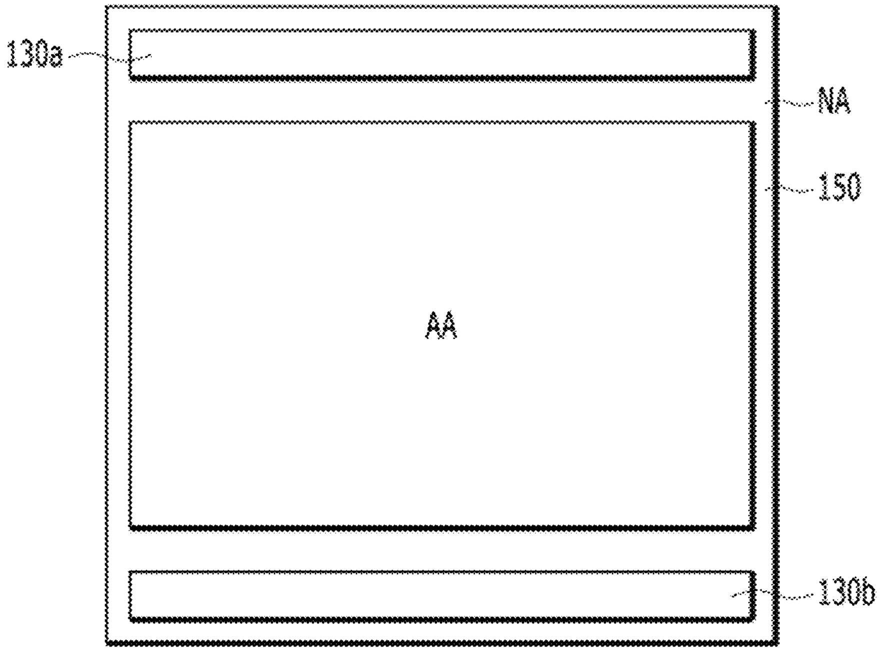
Figure 4:
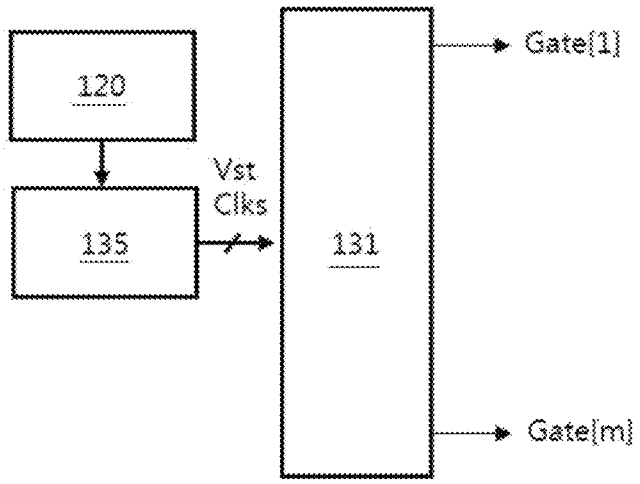
FIGS. 4 and 5 are diagrams illustrating configurations of devices related to the gate-in-panel type gate drivers.
Figure 5:
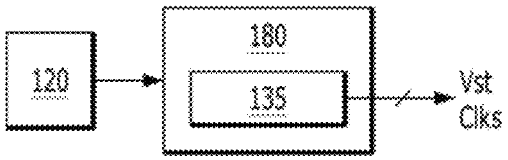

FIGS. 3A and 3B are diagrams showing examples of arrangement of a gate-in-panel type gate driver, and FIGS. 4 and 5 are diagrams showing examples of the configuration of a device related to the gate-in-panel type gate driver.

As shown in FIGS. 3A and 3B, the gate-in-panel type gate drivers 130*a* and 130*b* are disposed in non-display areas NA of the display panel 150. As shown in FIG. 3A, the gate drivers 130*a* and 130*b* may be disposed in left and right non-display areas NA of the display panel 150. As shown in FIG. 3B, the gate drivers 130*a* and 130*b* may be disposed in upper and lower non-display areas NA of the display panel 150.

Although the gate drivers 130*a* and 130*b* are illustrated and described as being disposed in the non-display areas NA positioned on the left and right sides or upper and lower sides of a display area AA as an example, only one gate driver may be disposed at the left, right, upper or lower side.

As shown in FIG. 4, the gate-in-panel type gate driver may include a shift register 131 and a level shifter 135. The level shifter 135 may generate clock signals Clks and a start signal Vst based on signals and voltages output from the timing controller 120 and a power supply unit 180. The clock signals Clks may be generated in the form of K (K being an integer equal to or greater than 2) phases having different phases, such as 2 phases, 4 phases, or 8 phases.

The shift register 131 operates based on signals Clks and Vst output from the level shifter 135 and may output gate signals Gate[1] to Gate [m] for turning on or off transistors formed in the display panel. The shift register 131 may take the form of a thin film on the display panel according to a gate-in-panel method. Accordingly, 130*a* and 130*b* in FIGS. 3A and 3B may correspond to the shift register 131.

As shown in FIGS. 4 and 5, the level shifter 135 may be independently formed in the form of an IC, unlike the shift register 131, or may be included in the power supply unit 180 that generates and outputs power required to drive the display panel. However, this is only an example and the level shifter is not limited thereto.

Figure 6:
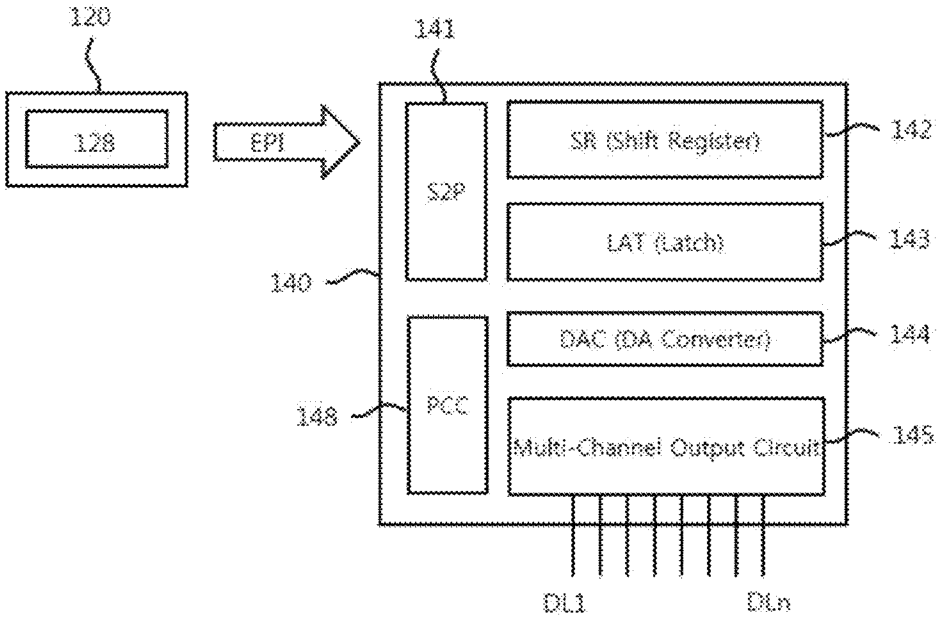
FIG. 6 is a diagram schematically showing internal blocks of a timing controller and a data driver according to a first aspect of the present disclosure.
Figure 7:
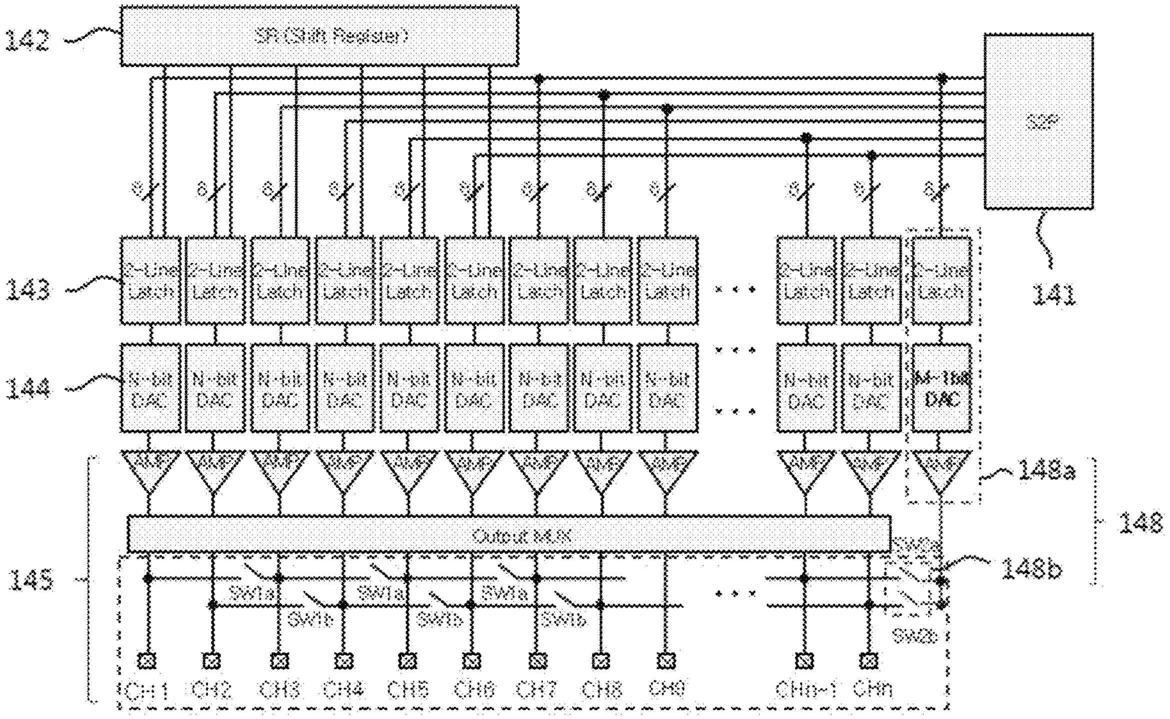
FIG. 7 is a diagram showing some of internal blocks of the data driver according to the first aspect of the present disclosure in detail.
Figure 8:
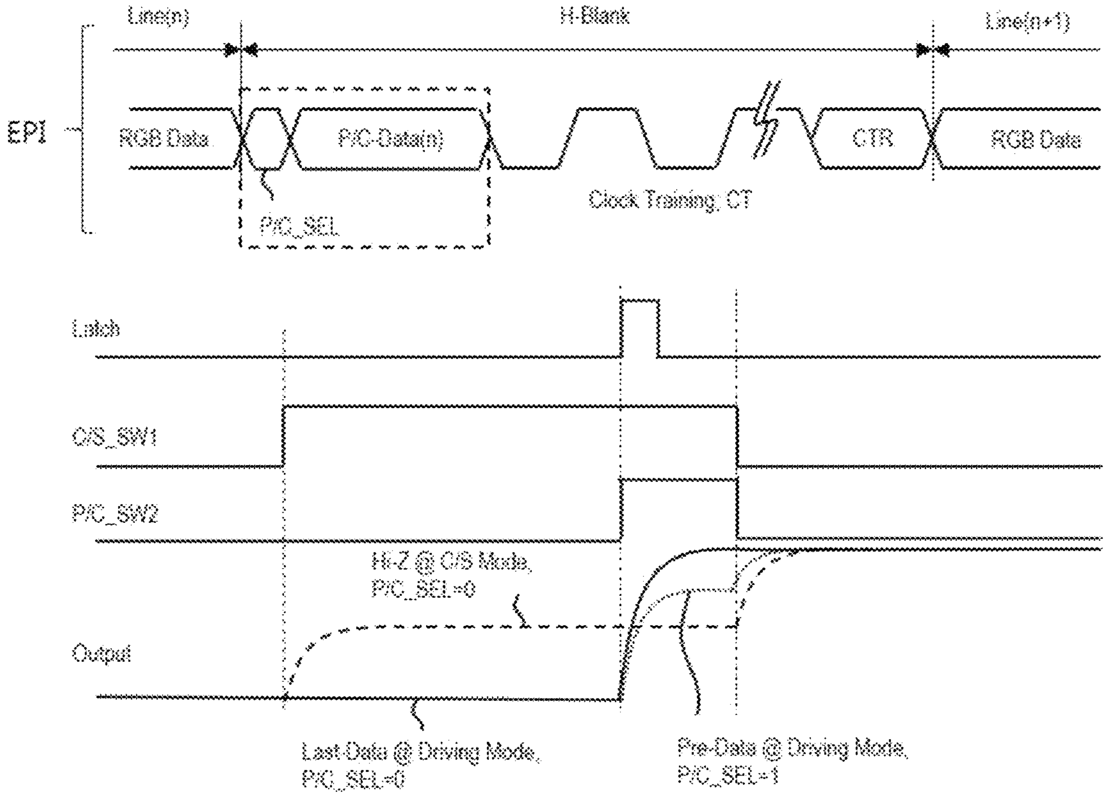
FIG. 8 is a diagram showing a part of an EPI signal and driving waveforms of the device according to the first aspect of the present disclosure.
Figure 9:
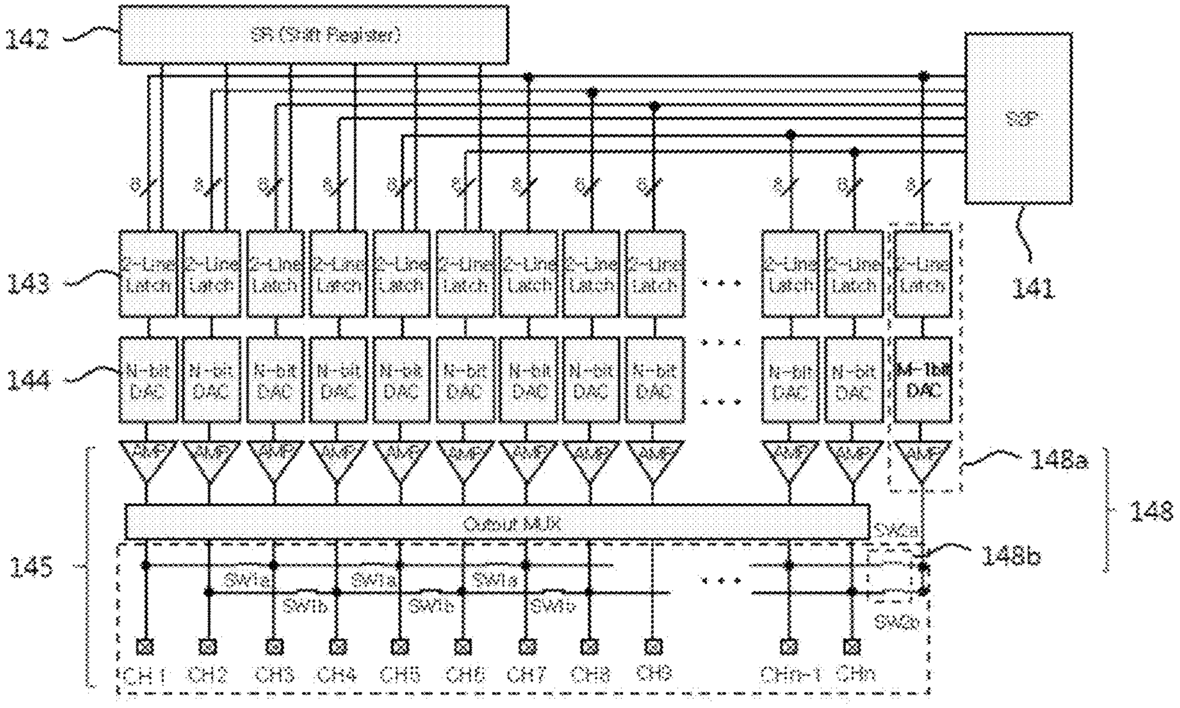
FIG. 9 is a diagram showing operating states of switches when charge sharing and precharging operations are performed according to the first aspect of the present disclosure.
Figure 10:
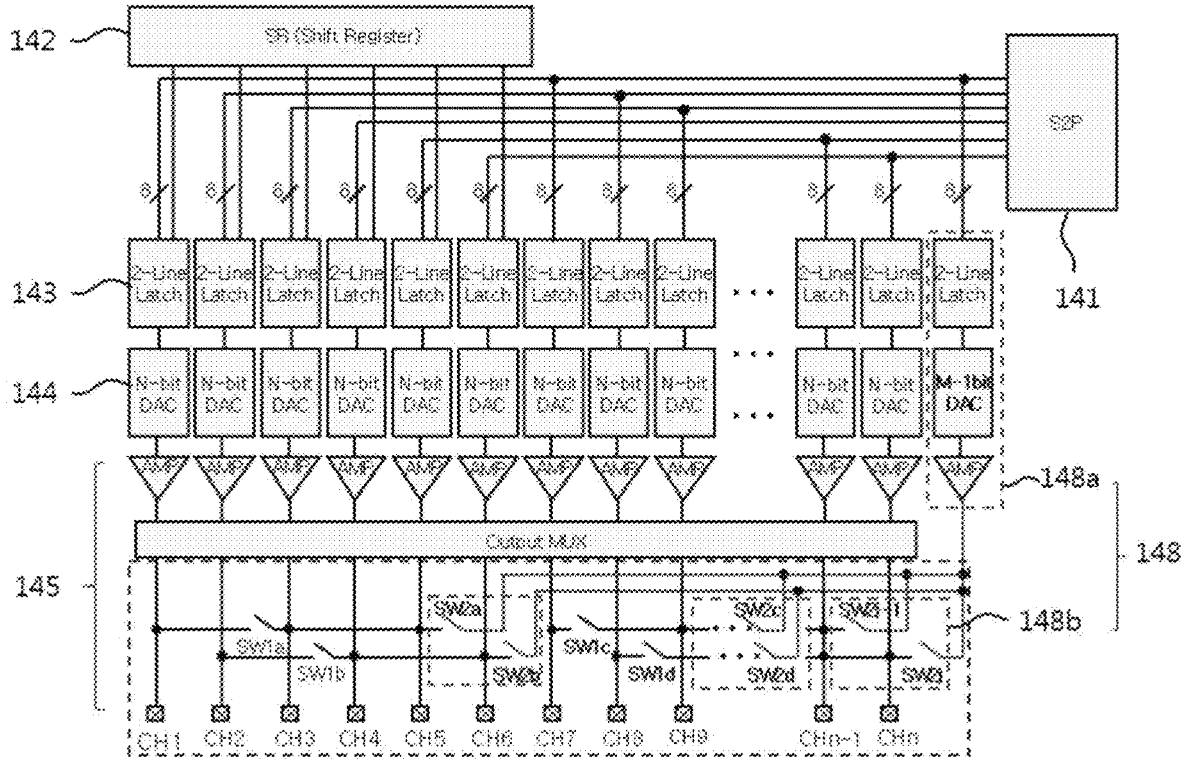
FIG. 10 is a diagram showing some of the internal blocks of the data driver according to a modified example of the first aspect of the present disclosure in detail.

FIG. 6 is a diagram schematically showing internal blocks of a timing controller and a data driver according to the first aspect of the present disclosure, FIG. 7 is a diagram showing some of the internal blocks of the data driver according to the first aspect of the present disclosure in detail, FIG. 8 is a diagram showing a part of an EPI signal and driving waveforms of the device according to the first aspect of the present disclosure, FIG. 9 is a diagram showing operating states of switches when charge sharing and precharging operations are performed according to the first aspect of the present disclosure, and FIG. 10 is a diagram showing some of the internal blocks of the data driver according to a modified example of the first aspect of the present disclosure in detail.

As shown in FIG. 6, the timing controller 120 and the data driver 140 transmit and receive various signals through an embedded panel interface (EPI) based on embedded clocks.

The data driver 140 may include a control circuit (S2P) 141, a shift register (SR) 142, a latch (LAT) 143, a DA converter (DAC) 144, a multi-channel output circuit 145, a precharge circuit (PCC) 148, etc. However, the internal blocks of the data driver 140 shown in FIG. 6 are merely an example and are not limited thereto.

The control circuit 141 may perform an operation of controlling the shift register 142, the latch 143, the DAC 144, and the multi-channel output circuit 145. The shift register 142 and the latch 143 may perform an operation of storing parallel digital data signals transmitted through the EPI as serial digital data signals. The DAC 144 and the multi-channel output circuit 145 may perform an operation of converting a digital data signal into an analog data voltage and outputting the analog data voltage. The precharge circuit 148 may perform an operation of generating and outputting a precharge voltage.

The timing controller 120 may include a precharge controller 128. The precharge controller 128 included in the timing controller 120 may generate and output a signal for controlling a precharge circuit 148 included in the data driver 140. Hereinafter, an example in which the precharge controller 128 outputs a signal for controlling the precharge circuit 148 through the EPI will be described. However, the precharge controller 128 may directly control the precharge circuit 148 through a separate signal line.

As shown in FIG. 7, the precharge controller 128 includes a precharge voltage generator 148*a* that generates a precharge voltage and a precharge voltage transfer unit 148*b* that transfers the precharge voltage to output channels CH1 to CHn of the data driver.

The precharge voltage generator 148*a* may be implemented similarly or identically to components included in the latch 143, the DAC 144, and the multi-channel output circuit 145, and the precharge voltage transfer unit 148*b* may be implemented as switches.

The precharge voltage generator 148*a* may generate and output a precharge voltage based on a precharge data signal output through the control circuit 141. For example, according to the first aspect of the present disclosure, the precharge voltage generator 148*a* may be implemented with a 2-line latch, an M−1 bit DAC, and an amplifier AMP.

The 2-line latch included in the precharge voltage generator 148*a* may be configured in the same manner as a 2-line latch included in the latch 143 and receive an 8-bit digital data signal from the control circuit 141. The 2-line latch may include first and second latched, but is not limited thereto.

The M−1 bit DAC included in the precharge voltage generator 148*a* may be configured in the same manner as an N-bit DAC included in the DAC 144. However, the M−1 bit DAC included in the precharge voltage generator 148*a* may have a lower resolution than the N-bit DAC included in the DAC 144.

This is because the precharge voltage generator 148*a* does not provide voltages of various levels for grayscale expression like data voltages. In addition, this is because the precharge voltage can be sufficiently generated and output even when the M−1 bit DAC is configured as a DAC for achieving half the full gray. Accordingly, when N of the N-bit DAC is 8 bits, M of the M−1 bit DAC may be equal to N, but may be 7 bits or less. However, this is only an example, and the present disclosure is not limited thereto.

The amplifier AMP included in the precharge voltage generator 148*a* may have the same configuration as an amplifier AMP included in the multi-channel output circuit 145. However, the amplifier AMP included in the precharge voltage generator 148*a* needs to have superior current driving capability to the amplifier AMP included in the multi-channel output circuit 145 (or the higher the performance, the better).

The precharge voltage transfer unit 148*b* may transfer the precharge voltage output from the precharge voltage generator 148*a* to the output channels CH1 to CHn of the data driver based on a precharge selection signal output through the control circuit 141. For example, according to the first aspect of the present disclosure, the precharge voltage transfer unit 148*b* may be implemented as precharge switches SW2*a* and SW2*b*.

The precharge switches SW2*a* and SW2*b* included in the precharge voltage transfer unit 148*b* may be configured as transistors in the same manner as charge-sharing switches SW1*a* and SW1*b* included in the multi-channel output circuit 145. The charge-sharing switches SW1*a* and SW1*b* may be defined as a charge-sharing unit. The precharge voltage is output when the precharge switches SW2*a* and SW2*b* are turned on by the precharge selection signal, but is not output when the precharge switches SW2*a* and SW2*b* are not turned on.

For example, the charge-sharing switches SW1*a* and SW1*b* included in the multi-channel output circuit 145 may include first charge-sharing switches SW1*a* that commonly connect odd-numbered output channels CH1 and CH3 to CHn−1 of the data driver, and second charge-sharing switches SW1*b* that commonly connect even-numbered output channels CH2 and CH4 to CHn. In addition, the precharge switches SW2*a* and SW2*b* included in the precharge voltage transfer unit 148*b* may include first precharge switches SW2*a* connected to the first charge-sharing switches SW1*a* and second precharge switches SW2*b* connected to the second charge-sharing switches SW1*b*.

The first precharge switches SW2*a* included in the precharge voltage transfer unit 148*b* may transfer the precharge voltage to the odd-numbered output channels CH1 and CH3 to CHn−1 of the data driver through the first charge-sharing switches SW1*a*. In addition, the second precharge switches SW2*b* included in the precharge voltage transfer unit 148*b* may transfer the precharge voltage to the even-numbered output channels CH2 and CH4 to CHn of the data driver through the second charge-sharing switches SW1*b*.

Meanwhile, in the first aspect, the multi-channel output circuit 145 includes the amplifier AMP, an output multiplexer MUX, and the charge-sharing switches SW1*a* and SW1*b* as an example, but is limited thereto.

As shown in FIG. 8, signals transmitted through the EPI may include a data signal RGB Data, a precharge selection signal P/C_SEL, a precharge data signal P/C-Data(n), a clock training signal CT, a control signal CRT, and the like. The precharge selection signal P/C_SEL, the precharge data signal P/C-Data(n), the clock training signal CT, and the control signal CRT excluding the data signal RGB Data for displaying an image of an N-th line Line(n) or an image of an (N−1)-th line Line(n+1) may be transmitted in a horizontal blank period H-Blank.

As shown in FIGS. 7 and 8, the latch 143 operates in response to a logic-high latch signal Lath generated in the horizontal blank section H-Blank and can latch the data signal RGB Data. The charge-sharing switches SW1*a* and SW1*b* may perform charge sharing such that at least two output channels CH1 to CHn of the data driver share charges in response to a logic-high charge-sharing signal C/S_SW1 generated in the horizontal blank period H-Blank. The precharge switches SW2*a* and SW2*b* may transfer a precharge voltage to the output channels CH1 to CHn of the data driver in response to a logic-high precharge signal P/C_SW2 generated in the horizontal blank period H-Blank.

Meanwhile, the precharge signal P/C_SW2 may be generated at a logic high or logic low in response to the precharge selection signal P/C_SEL, and the level of the precharge voltage may vary in response to the precharge data signal P/C-Data(n).

As can be ascertained from FIG. 8, when the precharge selection signal P/C_SEL of 1 instead of 0 is applied, the precharge voltage can be transferred to the output channels CH1 to CHn of the data driver. In addition, transition of the precharge signal P/C_SW2 to logic high can occur in synchronization with the start time (rising edge) of the latch signal Lath, and transition of the precharge signal P/C_SW2 to logic low can occur in synchronization with the end time (falling edge) of the charge-sharing signal C/S_SW1. That is, the precharging operation may partially overlap the charge-sharing operation and may be terminated simultaneously with the charge-sharing operation. However, this is merely an example.

In FIG. 8, "Last-Data @ Driving Mode, P/C_SEL=0" represents a waveform showing an output state when the precharge selection signal P/C_SEL of 0 is applied when a data voltage is output by the driving mode of the data driver 140. Further, "Pre-Data @ Driving Mode, P/C_SEL=1" represents a waveform showing an output state when the precharge selection signal P/C_SEL of 1 is applied when the data voltage is output by the driving mode of the data driver 140. In addition, "Hi-Z @ C/S Mode, P/C_SEL=0" represents a waveform showing an output state when the precharge selection signal P/C_SEL of 0 is applied during a high impedance (when the data voltage is not output) due to the charge-sharing mode of the data driver 140.

As can be ascertained with reference to FIGS. 8 and 9, the timing at which the charge-sharing operation and the precharging operation occur may partially overlap (there may be a period in which the charge-sharing operation and the precharging operation simultaneously occur). This is because the precharge voltage is transferred to the output channels CH1 to CHn of the data driver through the charge-sharing switches SW1*a* and SW1*b*. Accordingly, the charge-sharing switches SW1*a* and SW1*b* and the precharge switches SW2*a* and SW2*b* may have a period in which they are simultaneously turned on.

Meanwhile, an example in which the charge-sharing switches SW1*a* and SW1*b* included in the multi-channel output circuit 145 are separately connected to the odd-numbered output channels CH1 and CH3 to CHn−1 and the even-numbered output channels CH2 and CH4 to CHn has been described above. In this method, charge-sharing can be performed for all output channels by dividing the output channels into odd-numbered output channels and the even-numbered output channels. However, as shown in FIG. 10, the charge-sharing operation may be performed between three adjacent odd-numbered output channels and three adjacent even-numbered output channels. This will be described as a modified example as follows.

As shown in FIG. 10, the charge-sharing switches SW1*a* and SW1*b* included in the multi-channel output circuit 145 may include a first charge-sharing switch SW1*a* that commonly connects three odd-numbered output channels CH1, CH3, and CH5 adjacent in the data driver, and a second charge-sharing switch SW1*b* that commonly connects three adjacent even-numbered output channels CH2, CH4, and CH6. Note that in FIG. 10, only some charge-sharing switches are illustrated due to spatial limitations.

In addition, the precharge switches SW2*a* to SW2*j* included in the precharge voltage transfer unit 148*b* may include a first precharge switch SW2*a* connected to the first charge-sharing switch SW1*a* and a second precharge SW2*b* connected to the second charge-sharing switch SW1*b*. Note that in FIG. 10, only some precharge switches are illustrated due to spatial limitations.

The first precharge switch SW2*a* included in the precharge voltage transfer unit 148*b* can transfer the precharge voltage to the three adjacent odd-numbered output channels CH1, CH3, and CH5 in the data driver through the first charge-sharing switch SW1*a*. In addition, the second precharge switch SW2*b* included in the precharge voltage transfer unit 148*b* can transfer the precharge voltage to the even-numbered output channels CH2, CH4, and CH6 of the data driver through the second charge-sharing switch SW1*b*.

Meanwhile, the structure according to the modified example of the first aspect differs from the first aspect in that precharging as well as charge sharing can be performed for three adjacent odd-numbered output channels CH1, CH3, and CH5 and the three adjacent even-numbered output channels CH2, CH4, and CH6.

Figure 11:
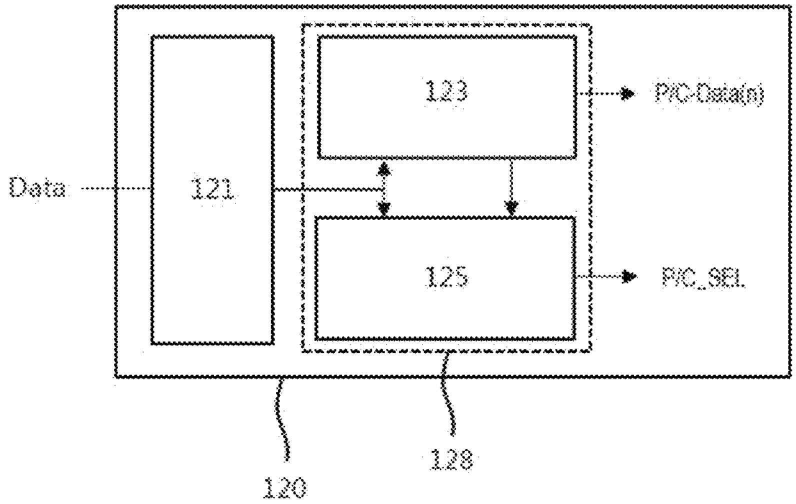
FIG. 11 is a diagram specifically showing some of the internal blocks of the timing controller according to the first aspect of the present disclosure.
Figure 12:
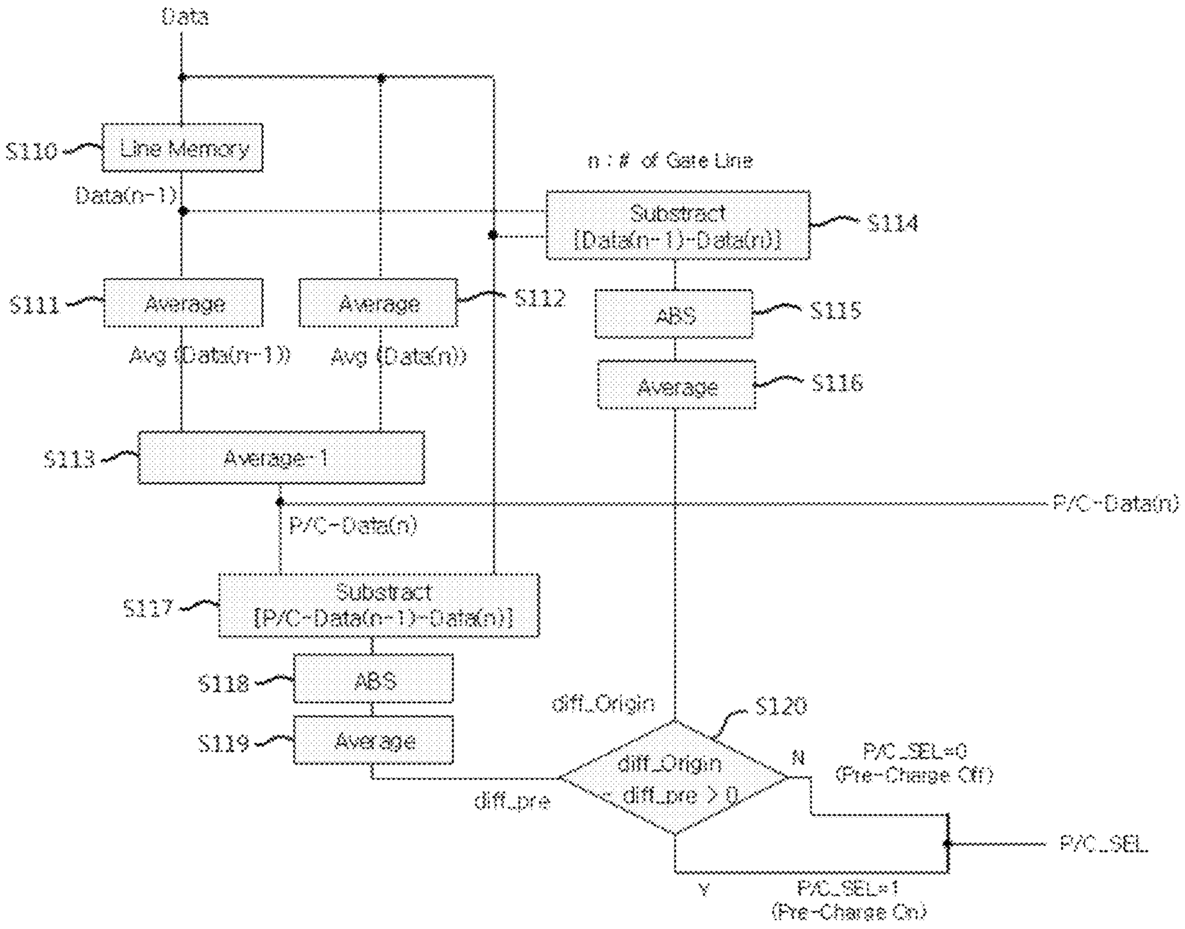
FIG. 12 is a flowchart for describing the operation of the timing controller shown in FIG. 11.

FIG. 11 is a diagram specifically showing some of the internal blocks of the timing controller according to the first aspect of the present disclosure, and FIG. 12 is a flowchart for describing the operation of the timing controller shown in FIG. 11.

As shown in FIG. 11, the timing controller 120 may include the precharge controller 128 including a precharge data signal generator 123 and a precharge selection signal generator 125 in addition to a line memory 121.

The line memory 121 may serve to store a data signal Data supplied from the outside line by line. The precharge data signal generator 123 may serve to generate a current precharge data signal P/C-Data(n) based on an average value of current line data signals and an average value of previous line data signals. The precharge selection signal generator 125 may serve to generate a precharge selection signal P/C_SEL based on an average value of absolute values obtained by subtracting current line data signals from previous line data signals and an average value of absolute values obtained by subtracting current line data signals from previous precharge data signals.

As shown in FIG. 12, the data signal Data supplied from the outside may be stored line by line in the line memory (S110). Hereinafter, an example in which a previous line data signal Data(n−1) is stored in the line memory will be described.

Subsequently, an average value Avg(Data(n−1)) of previous line data signals stored in the line memory may be calculated (S111), and at the same time an average value Avg(Data(n)) of current line data signals may be calculated (S112).

The average value Avg(Data(n−1)) of the previous line data signals may be calculated based on Equation 1 below, and the average value Avg(Data(n)) of the current line data signals may be calculated based on Equation 2 below.

$$avg\_\text{Line}\ (n-1) = \frac{1}{N}\left(\sum_{k=1}^{N} \text{Line}\ (n-1)P(k)\right) \quad \text{[Equation 1]}$$

$$avg\_\text{Line}\ (n) = \frac{1}{N}\left(\sum_{k=1}^{N} \text{Line}\ (n)P(k)\right) \quad \text{[Equation 2]}$$

In Equations 1 and 2, P denotes a sub-pixel. Note that $$N = \frac{3 * \text{Horizontal resolution}}{\text{Number of } DICs}$$

because it relates to the number of data drivers (DIC), RGB data signals, and horizontal resolution.

Subsequently, current precharge data signals P/C-Data(n) may be generated based on the average value Avg(Data(n)) of the current line data signals and the average value Avg(Data(n−1)) of the previous line data signals (S113). The current precharge data signals P/C-Data(n) may be generated based on Equation 3 below.

$$P/C\text{−Data}\ (n) = \frac{1}{2}(avgLine(n-1) + avgLine(n)) - 1$$

Subsequently, difference values Subtract between previous line data signals Data(n−1) and current line data signals Data(n) may be calculated (S114), absolute values ABS of the difference values Subtract may be calculated (S115), and an average value Average of the absolute values (ABS) may be calculated (S116). A first difference value diff_Origin may be calculated through these steps S114 to S116. The first difference value diff_Origin may be calculated based on Equation 4 below.

$$diff\_\text{Origin} = \frac{1}{N}\left(\sum_{k=1}^{N} |\text{Line}\ (n-1)P(k) - \text{Line}\ (n)P(k)|\right) \quad \text{[Equation 4]}$$

Subsequently, difference values Subtract between previous precharge data signals P/C-Data(n−1) and current line data signals Data(n) may be calculated (S117), absolute values ABS of the difference values Subtract may be calculated (S118), and an average value Average of the absolute values ABS may be calculated (S119). A second difference value diff_pre may be calculated through these steps S117 to S119. The second difference value diff_pre may be calculated based on Equation 5 below.

$$diff\_pre = \frac{1}{N}\left(\sum_{k=1}^{N} |P/C\text{−Data}\ (n)P(k) - \text{Line}\ (n)P(k)|\right) \quad \text{[Equation 5]}$$

Subsequently, the precharge selection signal P/C_SEL may be generated based on whether a difference between the first difference value diff_Origin and the second difference value diff_pre is greater than 0 (S120). Here, when the difference between the first difference value diff_Origin and the second difference value diff_pre is greater than 0 (Y), the precharge selection signal P/C_SEL may be generated as 1. That is, a signal for performing a precharging operation can be generated. On the other hand, when the difference between the first difference value diff_Origin and the second difference value diff_pre is less than 0 (N), the precharge selection signal P/C_SEL may be generated as 0. That is, a signal for not performing the precharging operation may be generated.

In the display device according to the first aspect of the present disclosure, the size of the precharge data signal (the magnitude of the precharge voltage) can be determined as well as whether the precharging operation is performed (precharging operation/non-precharging operation) for each image pattern. An example will be described below.

Hereinafter, FIGS. 13 to 17 are diagrams illustrating examples of a pattern in which the precharging operation is performed, and FIGS. 18 to 21 are diagrams illustrating examples of a pattern in which the precharging operation is not performed.

FIG. 13 shows an example in which the precharging operation can be performed in the case of a subdot pattern in which a data signal Data is output in the form of a stepping stone for each channel and the output position thereof is alternately changed on a line-by-line basis.

FIG. 14 shows an example in which the precharging operation can be performed in the case of a horizontal one-line (H-1Line) pattern in which the data signal Data is output over all channels of one line and is not output over all channels of the next line, and this output pattern is alternately changed on a line-by-line basis.

FIG. 15 shows an example in which the precharging operation can be performed in the case of a sub-2-dot pattern in which the data signal Data is output in the form of a stepping stone for two channels and the output position thereof is alternately changed on a line-by-line basis.

FIG. 16 shows an example in which the precharging operation can be performed in the case of a dot pattern in which the data signal Data is output in the form of a stepping stone for each RGB channel and the output position thereof is alternately changed on a line-by-line basis.

FIG. 17 shows an example in which the precharging operation can be performed in the case of a random pattern in which the data signal Data is randomly output with different grayscales over all channels.

As described above, the precharging operation can be performed according to the first aspect in the patterns as shown in FIGS. 13 to 16 as can be ascertained through a relational expression diff_Origin-diff_pre>0 shown on the right, a precharge data signal value (P/C−data(n): 127 or 125), and a precharge selection signal value (P/C_SEL:1).

FIG. 18 shows an example in which the precharging operation may not be performed in the case of a red pattern in which the data signal Data is output to only R channels over all lines.

FIG. 19 shows an example in which the precharging operation may not be performed in the case of a green pattern in which the data signal Data is output to only G channels over all lines.

FIG. 20 shows an example in which the precharging operation may not be performed in the case of a full gray pattern composed of red, green and blue in which the data signal Data is output to all lines and all channels.

FIG. 21 shows an example in which the precharging operation may not be performed in the case of a vertical sub-pattern in which the data signal Data is output in the form of a stepping stone for each channel in the vertical direction and the output position thereof is maintained.

As described above, the precharging operation may not be performed according to the first aspect in the patterns as shown in FIGS. 18 to 21 as can be ascertained through a relational expression diff_Origin-diff_pre<0 shown on the right side, a precharge data signal value (P/C−data(n): 84, 41, 254 or 127), and a precharge selection signal value (P/C_SEL:0).

However, FIGS. 13 to 21 merely show some examples in which the precharging operation may or may not be performed depending on patterns, and whether or not the precharging operation is performed may vary depending on the characteristics (grayscale value) of the data signal or the calculation formula.

Figure 22:
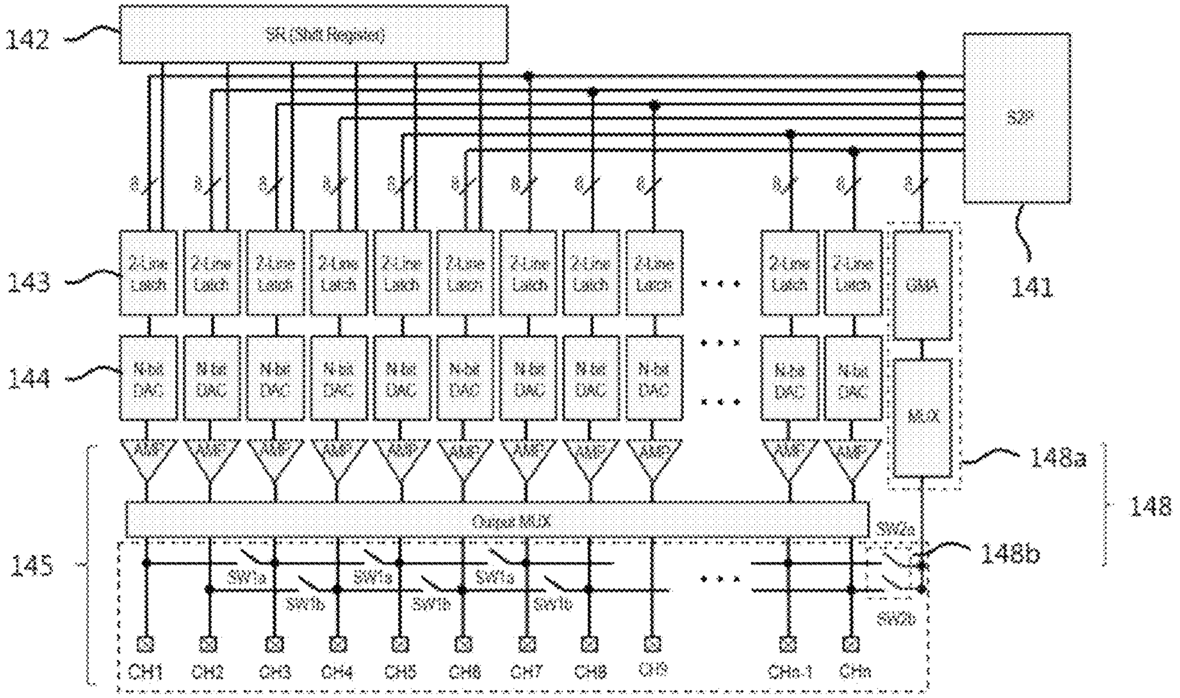
FIGS. 22 and 23 are diagrams specifically showing some of internal blocks of a data driver according to a second aspect of the present disclosure.
Figure 23:
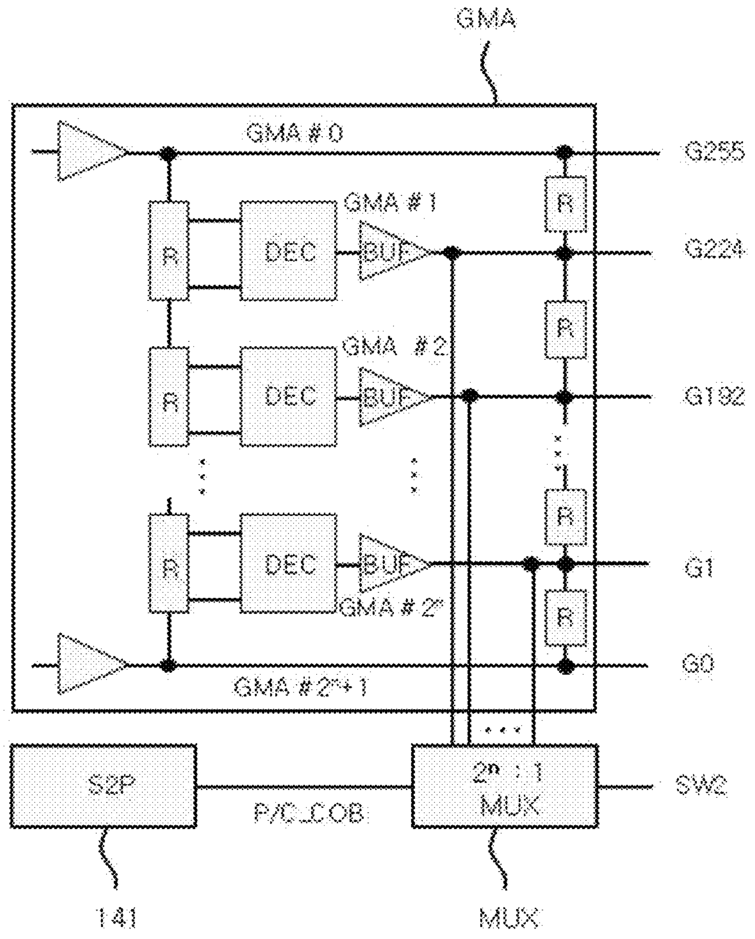
Figure 24:
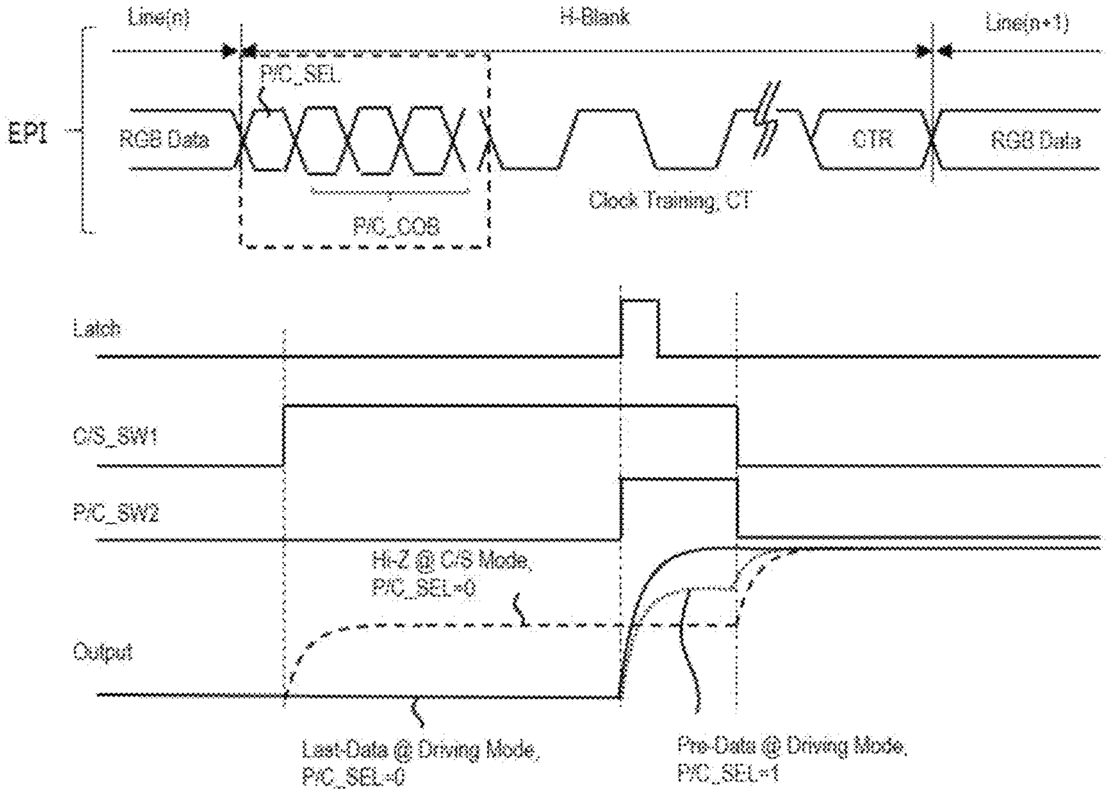
FIG. 24 is a part of an EPI signal and driving waveforms of the device according to the second aspect of the present disclosure.
Figure 25:
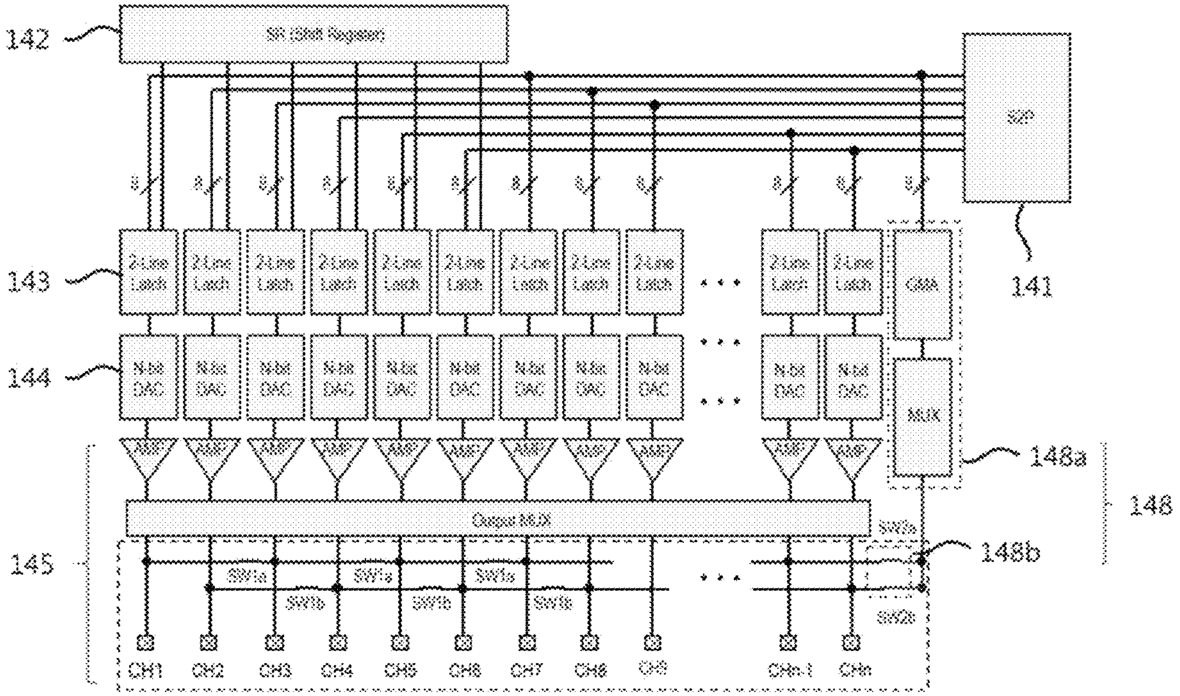
FIG. 25 is a diagram showing operating states of switches when charge-sharing and pre-charging operations are performed according to the second aspect of the present disclosure.
Figure 26:
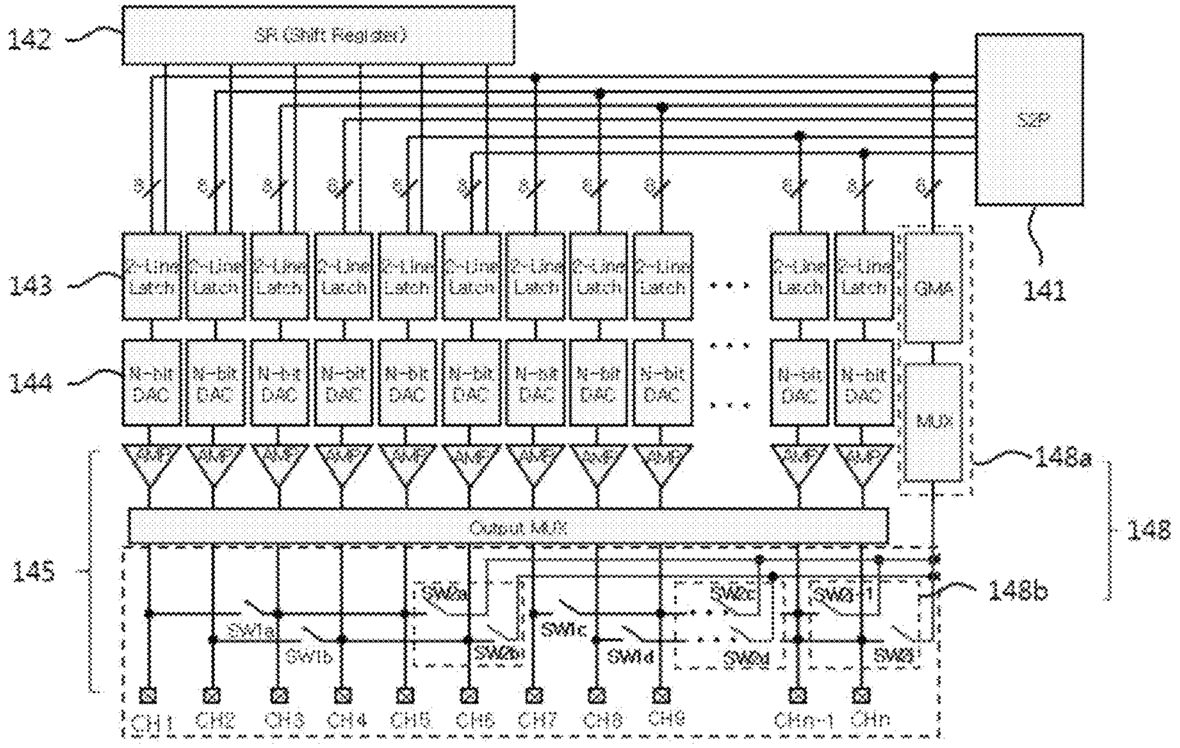
FIG. 26 is a diagram specifically showing some of the internal blocks of the data driver according to a modified example of the second aspect of the present disclosure.

FIGS. 22 and 23 are diagrams specifically showing some of internal blocks of a data driver according to a second aspect of the present disclosure, and FIG. 24 is a part of an EPI signal and driving waveforms of the device according to the second aspect of the present disclosure. FIG. 25 is a diagram showing operating states of switches when charge-sharing and pre-charging operations are performed according to the second aspect of the present disclosure, and FIG. 26 is a diagram specifically showing some of the internal blocks of the data driver according to a modified example of the second aspect of the present disclosure.

As shown in FIGS. 22 and 23, a precharge controller 128 may include a precharge voltage generator 148*a* that generates a precharge voltage and a precharge voltage transfer unit 148*b* that transfers the precharge voltage to output channels CH1 to CHn of the data driver.

The precharge voltage generator 148*a* may be implemented to select one of gamma voltages and output a precharge voltage based thereon, and the precharge voltage transfer unit 148*b* may be implemented as switches.

The precharge voltage generator 148*a* may select one of the gamma voltages in response to a precharge bit signal P/C_COB output through a control circuit 141 and output a precharge voltage based thereon (i.e., use one of the gamma voltages as a precharge voltage). For example, according to the second aspect of the present disclosure, the precharge voltage generator 148*a* may be implemented as a gamma voltage generator GMA and a selector MUX. However, since the gamma voltage generator GMA corresponds to an existing component that provides a gamma voltage to the data driver 140, description will be given on the assumption that the existing component rather than a newly added component is used as the gamma voltage generator GMA to eliminate redundant configurations of a device and reduce costs. The gamma voltage generator GMA may be separately provided. However, hereinafter, an example in which the gamma voltage generator GMA having the existing configuration uses eight gamma tap voltages GMA #1 to GMA #8 will be described.

The gamma voltage generator GMA may include a resistor string R, a decoder DEC, and a buffer BUF. In addition, the gamma voltage generator GMA may be divided into a highest gamma tap voltage output unit GMA #0 that outputs a maximum gamma voltage G255, a lowest gamma tap voltage output unit GMA #2n+1 that outputs a lowest gamma voltage G0, and intermediate gamma tap voltage output units GMA #1 to GMA #2n that output gamma voltages G224 and G192 to G1 therebetween.

The selector MUX included in the precharge voltage generator 148*a* may be configured as a 2n:1 multiplexer and connected to the gamma voltage generator GMA, and may perform a selection operation based on the precharge bit signal P/C_COB output from the control circuit 141. In the 2n:1 multiplexer, n corresponds to the number of gamma taps to be used in the gamma voltage generator GMA. For example, the selector MUX may select and output, as a precharge voltage, a gamma voltage output from one buffer BUF of the first to eighth intermediate gamma tap voltage output units GMA #1 to GMA #8 in response to the precharge bit signal P/C_COB.

The precharge voltage transfer unit 148*b* may transfer the precharge voltage output from the precharge voltage generator 148*a* to the output channels CH1 to CHn of the data driver based on a precharge selection signal output through the control circuit 141. For example, according to the second aspect of the present disclosure, the precharge voltage transfer unit 148*b* may be implemented as precharge switches SW2*a* and SW2*b*.

The precharge switches SW2*a* and SW2*b* included in the precharge voltage transfer unit 148*b* may include transistors in the same manner as the charge-sharing switches SW1*a* and SW1*b* included in the multi-channel output circuit 145. The charge-sharing switches SW1*a* and SW1*b* may be defined as a charge-sharing unit.

For example, the charge-sharing switches SW1*a* and SW1*b* included in the multi-channel output circuit 145 may include first charge-sharing switches SW1*a* for commonly connecting the odd-numbered output channels CH1 and CH3 to CHn−1 of the data driver SW1*a* and second charge-sharing switches SW1*b* for commonly connecting the even-numbered output channels CH2 and CH4 to CHn. In addition, the precharge switches SW2*a* and SW2*b* included in the precharge voltage transfer unit 148*b* may include first precharge switches SW2*a* connected to the first charge-sharing switches SW1*a* and second precharge switches SW2*b* connected to the second charge-sharing switches SW1*b*.

The first precharge switches SW2*a* included in the precharge voltage transfer unit 148*b* may transfer the precharge voltage to the odd-numbered output channels CH1 and CH3 to CHn−1 of the data driver through the first charge-sharing switches SW1*a*. In addition, the second precharge switches SW2*b* included in the precharge voltage transfer unit 148*b* may transfer the precharge voltage to the even-numbered output channels CH2 and CH4 to CHn of the data driver through the second charge-sharing switches SW1*b*.

As shown in FIG. 24, signals transmitted through an EPI may include a data signal RGB Data, a precharge selection signal P/C_SEL, a precharge bit signal P/C_COB, a clock training signal CT, a control signal CRT, and the like. The precharge selection signal P/C_SEL, a precharge data signal P/C-Data(n), the clock training signal CT, and the control signal CRT excluding the data signal RGB Data for displaying an image of an N-th line Line(n) or an image of an (N−1)-th line Line(n+1) may be transmitted in a horizontal blank period H-Blank.

As shown in FIGS. 22 to 24, a latch 143 operates in response to a logic-high latch signal Lath generated in the horizontal blank period H-Blank and can latch the data signal RGB Data. The charge-sharing switches SW1*a* and SW1*b* may perform charge sharing such that at least two of the output channels CH1 to CHn of the data driver share charges in response to a logic-high charge-sharing signal C/S_SW1 generated in the horizontal blank period H-Blank. The precharge switches SW2*a* and SW2*b* may transfer the precharge voltage to the output channels CH1 to CHn of the data driver in response to a logic-high precharge signal P/C_SW2 generated in the horizontal blank period H-Blank.

Meanwhile, the precharge signal P/C_SW2 may be generated at logic high or logic low in response to the precharge selection signal P/C_SEL, and the level of the precharge voltage may vary in response to the precharge bit signal P/C_COB.

As can be ascertained from FIG. 24, when the precharge selection signal P/C_SEL is applied as 1 instead of 0, the precharge voltage may be transferred to the output channels CH1 to CHn of the data driver. In addition, transition of the precharge signal P/C_SW2 to logic high can occur in synchronization with the start time (rising edge) of the latch signal Lath, and transition of the precharge signal P/C_SW2 to logic low can occur in synchronization with the end time (falling edge) of the charge-sharing signal C/S_SW1. However, this is merely an example.

In FIG. 24, "Last-Data @ Driving Mode, P/C_SEL=0" represents a waveform showing an output state when the precharge selection signal P/C_SEL is applied as 0 when a data voltage is output by the driving mode of the data driver 140. In addition, "Pre-Data @ Driving Mode, P/C_SEL=1" represents a waveform showing an output state when the precharge selection signal P/C_SEL is applied as 1 when the data voltage is output by the driving mode of the data driver 140. "Hi-Z @ C/S Mode, P/C_SEL=0" represents a waveform showing an output state when the precharge selection signal P/C_SEL is applied as 0 during a high impedance (when the data voltage is not output) due to the charge-sharing mode of the data driver 140.

As can be ascertained with reference to FIGS. 24 and 25, timings at which the charge-sharing operation and the precharging operation occur may partially overlap. This is because the precharge voltage is transferred to the output channels CH1 to CHn of the data driver through the charge-sharing switches SW1*a* and SW1*b*. Accordingly, the charge-sharing switches SW1*a* and SW1*b* and the precharge switches SW2*a* and SW2*b* may have a period in which they are simultaneously turned on.

Meanwhile, an example in which the charge-sharing switches SW1*a* and SW1*b* included in the multi-channel output circuit 145 are separately connected to the odd-numbered output channels CH1 and CH3 to CHn−1 and the even-numbered output channels CH2 and CH4 to CHn has been described above. In this method, charge-sharing can be performed for all output channels by dividing the output channels into odd-numbered output channels and even-numbered output channels. However, as shown in FIG. 26, the charge-sharing operation may be performed between three adjacent odd-numbered output channels and three adjacent even-numbered output channels. This will be described as a modified example as follows.

As shown in FIG. 26, the charge-sharing switches SW1*a* and SW1*b* included in the multi-channel output circuit 145 may include a first charge-sharing switch SW1*a* that commonly connects three odd-numbered output channels CH1, CH3, and CH5 adjacent in the data driver, and a second charge-sharing switch SW1*b* that commonly connects three adjacent even-numbered output channels CH2, CH4, and CH6. Note that in FIG. 26, only some charge-sharing switches are illustrated due to the limitation of the space.

In addition, the precharge switches SW2*a* to SW2*j* included in the precharge voltage transfer unit 148*b* may include a first precharge switch SW2*a* connected to the first charge-sharing switch SW and a second precharge SW2*b* connected to the second charge-sharing switch SW1*b*. Note that in FIG. 26, only some precharge switches are illustrated due to spatial limitations.

The first precharge switch SW2*a* included in the precharge voltage transfer unit 148*b* can transfer the precharge voltage to the three adjacent odd-numbered output channels CH1, CH3, and CH5 in the data driver through the first charge-sharing switch SW1*a*. In addition, the second precharge switch SW2*b* included in the precharge voltage transfer unit 148*b* can transfer the precharge voltage to the even-numbered output channels CH2, CH4, and CH6 of the data driver through the second charge-sharing switch SW1*b*.

Meanwhile, the structure according to the modified example of the second aspect differs from the second aspect in that precharging as well as charge sharing can be performed for three adjacent odd-numbered output channels CH1, CH3, and CH5 and the three adjacent even-numbered output channels CH2, CH4, and CH6.

Figure 27:
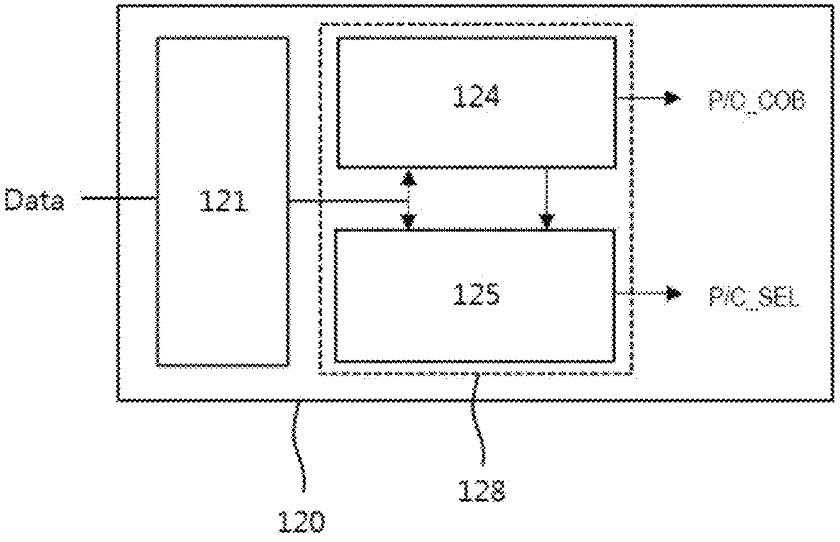
FIG. 27 is a diagram specifically showing some of the internal blocks of the timing controller according to the second aspect of the present disclosure.
Figure 28:
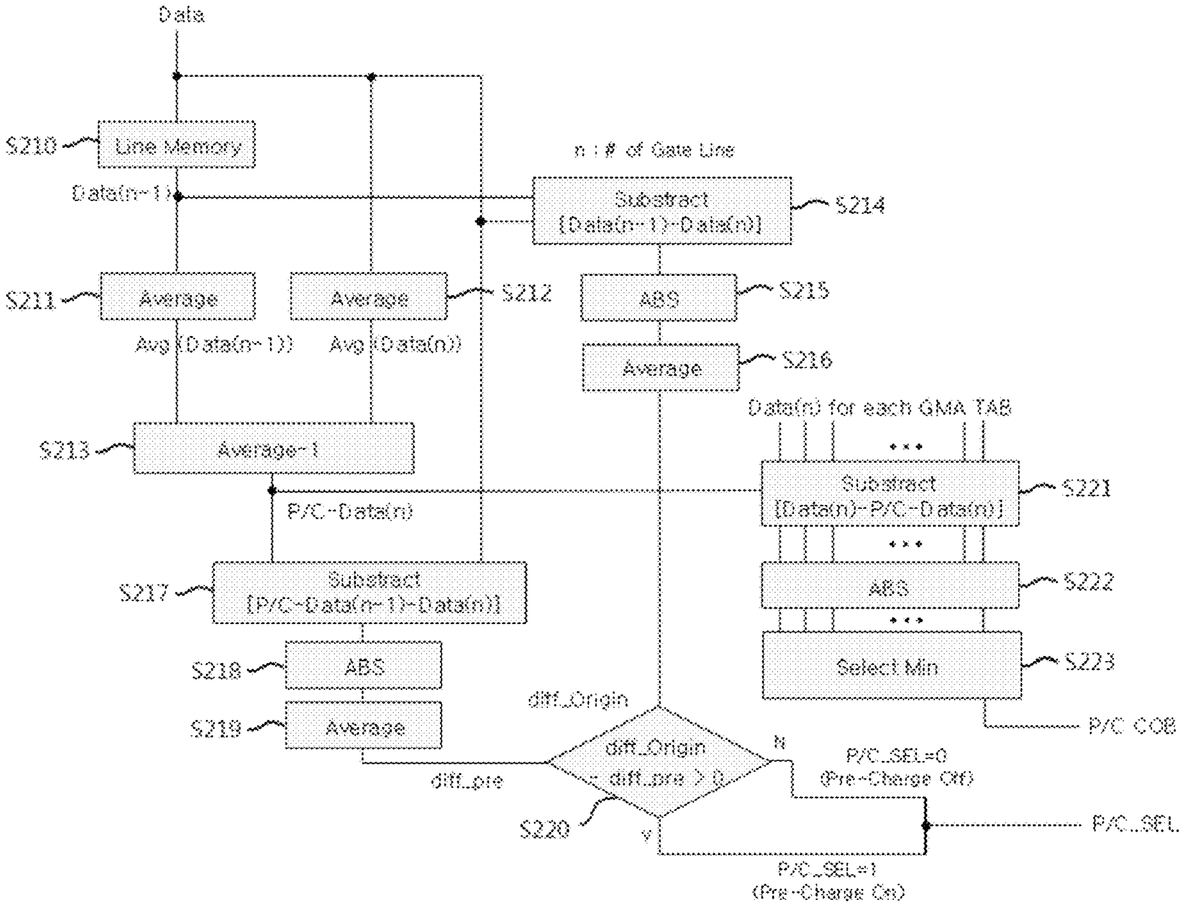
FIG. 28 is a flowchart for describing the operation of the timing controller shown in FIG. 27.

FIG. 27 is a diagram specifically showing some of the internal blocks of the timing controller according to the second aspect of the present disclosure, and FIG. 28 is a flowchart for describing the operation of the timing controller shown in FIG. 27.

As shown in FIG. 27, the timing controller 120 may include the precharge controller 128 including a precharge bit signal generator 124 and a precharge selection signal generator 125 in addition to a line memory 121.

The line memory 121 may serve to store a data signal Data supplied from the outside line by line. The precharge bit signal generator 124 may serve to generate the precharge bit signal P/C-COB based on an average value of current line data signals and an average value of previous line data signals. The precharge selection signal generator 125 may serve to generate the precharge selection signal P/C_SEL based on an average value of absolute values obtained by subtracting current line data signals from previous line data signals and an average value of absolute values obtained by subtracting current line data signals from previous precharge data signals.

As shown in FIG. 28, the data signal Data supplied from the outside may be stored line by line in the line memory (S210). Hereinafter, an example in which a previous line data signal Data(n−1) is stored in the line memory will be described.

Subsequently, an average value Avg(Data(n−1)) of previous line data signals stored in the line memory may be calculated (S211), and at the same time an average value Avg(Data(n)) of current line data signals may be calculated (S212).

The average value Avg(Data(n−1)) of the previous line data signals may be calculated based on Equation 1 described in the first aspect, and the average value Avg(Data (n)) of the current line data signals may be calculated based on Equation 2 described in the first aspect.

Subsequently, current precharge data signals P/C-Data(n) may be generated based on the average value Avg(Data(n)) of the current line data signals and the average value Avg(Data(n−1)) of the previous line data signals (S213). The current precharge data signals P/C-Data(n) may be generated based on Equation 3 described in the first aspect.

Subsequently, difference values Subtract between the previous line data signals Data(n−1) and the current line data signal Data(n) may be calculated (S214), absolute values ABS of the difference values Subtract may be calculated (S215), and an average value Average of the absolute values ABS may be calculated (S216). A first difference value diff_Origin may be calculated through these steps S214 to S216. The first difference value diff_Origin may be calculated based on Equation 4 described in the first aspect.

Subsequently, difference values Subtract between previous precharge data signals P/C-Data(n−1) and current line data signals Data(n) may be calculated (S217), absolute values ABS of the difference values Subtract may be calculated (S218), and an average value Average of the absolute values ABS may be calculated (S219). A second difference value diff_pre may be calculated through these steps S217 to S219. The second difference value diff_pre may be calculated based on Equation 5 described in the first aspect.

Subsequently, the precharge selection signal P/C_SEL may be generated based on whether a difference between the first difference value diff_Origin and the second difference value diff_pre is greater than 0 (S220). Here, when the difference between the first difference value diff_Origin and the second difference value diff_pre is greater than 0 (Y), the precharge selection signal P/C_SEL may be generated as 1. That is, a signal for performing a precharging operation can be generated. On the other hand, when the difference between the first difference value diff_Origin and the second difference value diff_pre is less than 0 (N), the precharge selection signal P/C_SEL may be generated as 0. That is, a signal for not performing the precharging operation may be generated.

Subsequently, difference values Subtract between the current line data signals Data(n) and the current precharge data signals P/C-Data(n) may be calculated (S221), absolute values ABS of the difference values Subtract may be calculated (S222), and a minimum value Select Min of the absolute values ABS may be selected (S223). The precharge bit signal P/C_COB may be finally selected and output through the Select Min selection step S223.

When the difference values Subtract between the current line data signals Data(n) and the current precharge data signals P/C-Data(n) are calculated, a gamma tap voltage (Data(n) for each GMA TAB) may be referred to more accurately ascertain the voltage values of the current line data signals Data(n). The gamma tap voltage (Data(n) for each GMA TAB) may be an analog voltage value or a digital data value, but is not limited thereto.

Hereinafter, an example of one of processes for selecting the precharge bit signal P/C_COB based on the above-described method is shown in table 1 as follows. However, in Table 1 below, it is assumed that the precharge bit signal P/C_COB is 3 bits as an example.

TABLE 1

| GMA TAB | Data(n) | P/C − Data(n) | ABS(Data(n) − (P/CData(n)) | Min(ABS(Data(n) − (P/C − Data(n)))) | P/C COB (Control Bit) |
|---|---|---|---|---|---|
| #1 | 224 | 230 | \| 224 − 230 \| = 6 | Select | 000 |
| #2 | 192 | | \| 192 − 230 \| = 38 | Non-Select | 001 |
| #3 | 128 | | \| 128 − 230 \| = 102 | Non-Select | 010 |
| #4 | 64 | | \| 64 − 230 \| = 166 | Non-Select | 011 |
| #5 | 16 | | \| 16 − 230 \| = 214 | Non-Select | 100 |
| #6 | N/A | | N/A | N/A | 101 |
| #7 | N/A | | N/A | N/A | 110 |
| #8 | N/A | | N/A | N/A | 111 |

As can be ascertained from Table 1, the absolute values ABS(Data(n)−(P/CData(n)) of the difference values between the current line data signals Data(n) and the current precharge data signals P/C-Data(n) may be calculated as "6, 38, 102, 166, and 214". Further, as described above, the minimum value among these values is selected as the precharge bit signal P/C_COB, and thus a gamma voltage (e.g., 224) corresponding to "000" may be the precharge voltage.

As can be ascertained with reference to the above-described aspects, the present disclosure may predict an output transition amount of the data driver through a process such as comparing average values of previous line data signals and current line data signals, and the like, determine whether or not to perform the precharging operation in a direction in which an average transition amount of one line decreases, and output data for precharging. In addition, it is possible to generate and output a precharge voltage without using a separate power supply by outputting the data for precharging and a control signal in a clock training period (before the control signal is transmitted) included in the horizontal blank period. As a result, the display device according to the present disclosure has the advantage of maximizing the effect of reducing current consumption without degrading the performance of a specific device (e.g., deterioration of driving performance when data voltage is output, deterioration of the performance of a touch sensor due to a high impedance period, etc.) by performing the adaptive precharging operation irrespective of an image pattern.

What is claimed is:

1. A display device comprising:

a display panel configured to display an image;

a data driver configured to supply a data voltage to data lines of the display panel and having a precharge circuit configured to:

during charge sharing between the data lines, generate a precharge voltage based on a precharge signal supplied in a horizontal blank period, wherein a level of the precharge voltage varies based on the precharge signal, and selectively output the precharge voltage during the charge sharing based on a precharge selection signal; and a timing controller configured to control the data driver.

2. The display device according to claim 1, wherein the precharge circuit includes:

a precharge voltage generator configured to generate the precharge voltage based on the precharge signal; and a precharge voltage transfer circuit configured to transfer the precharge voltage to output channels of the data driver based on the precharge selection signal.

3. The display device according to claim 2, wherein the precharge voltage transfer circuit includes precharge switches connected to charge-sharing switches performing a charge-sharing operation such that charges are shared between at least two of the output channels of the data driver.

4. The display device according to claim 3, wherein generating the precharge voltage and the charge-sharing operation are simultaneously terminated.

5. The display device according to claim 2, wherein the precharge voltage generator includes a latch, a digital-to-analog converter (DAC), and an amplifier configured to generate the precharge voltage based on the precharge signal.

6. The display device according to claim 5, wherein the DAC is included in the data driver, or has the number of bits less than that of a second DAC included in the data driver.

7. The display device according to claim 2, wherein the precharge voltage generator includes a selector configured to select one of gamma voltages output from a gamma voltage generator and outputting the selected gamma voltage as the precharge voltage based on the precharge signal.

8. The display device according to claim 1, wherein the timing controller includes:

a precharge signal generator configured to generate the precharge signal; and a precharge selection signal generator configured to generate the precharge selection signal, wherein the precharge selection signal generator generates the precharge selection signal based on an average value of absolute values obtained by subtracting current line data signals from previous line data signals and an average value of absolute values obtained by subtracting the current line data signals from previous precharge data signals.

9. A method for driving a display device including a display panel configured to display an image, a data driver configured to supply a data voltage to the display panel and having a precharge circuit configured to perform a precharging operation, and a timing controller configured to control the data driver, the method comprising:

during charge sharing between data lines of the display device, generating a current precharge signal for generating a precharge voltage based on an average value of current line data signals and an average value of previous line data signals;

generating a precharge selection signal for determining whether to output the precharge voltage based on an average value of absolute values obtained by subtracting the current line data signals from the previous line data signals and an average value of absolute values obtained by subtracting the current line data signals from previous precharge signals; and outputting the precharge voltage through output channels of the data driver based on the current precharge signal and the precharge selection signal during the charge sharing, wherein a level of the precharge voltage is varied in response to the current precharge signal.

10. The method according to claim 9, wherein the outputting of the precharge voltage partially overlaps with charge-sharing for causing charge to be shared between at least two of the output channels of the data driver.

11. The method according to claim 10, wherein the outputting of the precharge voltage and the charge-sharing are simultaneously terminated.

* * * * *